(12) United States Patent
Yamada et al.

(10) Patent No.: US 10,207,740 B2
(45) Date of Patent: Feb. 19, 2019

(54) VEHICLE REAR BODY STRUCTURE

(71) Applicant: HONDA MOTOR CO., LTD., Tokyo (JP)

(72) Inventors: Takashi Yamada, Wako (JP); Hirokazu Nishiami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 15/245,691

(22) Filed: Aug. 24, 2016

(65) Prior Publication Data

US 2017/0057548 A1 Mar. 2, 2017

(30) Foreign Application Priority Data

Aug. 25, 2015 (JP) ................. 2015-165732

(51) Int. Cl.
  *B62D 21/15* (2006.01)
  *B60R 19/18* (2006.01)
  *B62D 25/08* (2006.01)
(52) U.S. Cl.
  CPC ............ *B62D 21/152* (2013.01); *B60R 19/18* (2013.01); *B62D 25/087* (2013.01)
(58) Field of Classification Search
  CPC ...... B62D 21/152; B62D 25/087; B60R 19/18
  USPC ........ 296/187.11, 203.04, 204; 293/102, 120
  See application file for complete search history.

(56) References Cited

U.S. PATENT DOCUMENTS

| 4,095,819 A * | 6/1978 | Schaper | B62D 21/152 280/784 |
| 5,431,445 A * | 7/1995 | Wheatley | B62D 21/152 188/377 |
| 6,554,176 B2 * | 4/2003 | McGill | B23K 15/0006 228/112.1 |
| 2004/0135382 A1* | 7/2004 | Sakuma | B60R 19/34 293/102 |
| 2013/0249243 A1* | 9/2013 | Lee | B62D 21/152 296/187.03 |

FOREIGN PATENT DOCUMENTS

JP 2013-233898 A 11/2013

* cited by examiner

*Primary Examiner* — Joseph D. Pape
(74) *Attorney, Agent, or Firm* — Westerman, Hattori, Daniels & Adrian, LLP

(57) ABSTRACT

A vehicle rear body structure 10 includes a left rear frame 13 that is formed to have a closed section. The left rear frame 13 has a lower member 22 that is formed to have a thickness dimension larger than an upper member 23 thereof. The left rear frame 13 has a first soft zone 24, a second soft zone 25, and a third soft zone 26. The first to third soft zones 24, 25, and 26 are portions with lower strength. The second soft zone 25 is provided in a ring shape throughout the circumference of the left rear frame 13. The first soft zone 24 and the third soft zone 26 are arranged in a lower half part of the left rear frame 13.

9 Claims, 17 Drawing Sheets

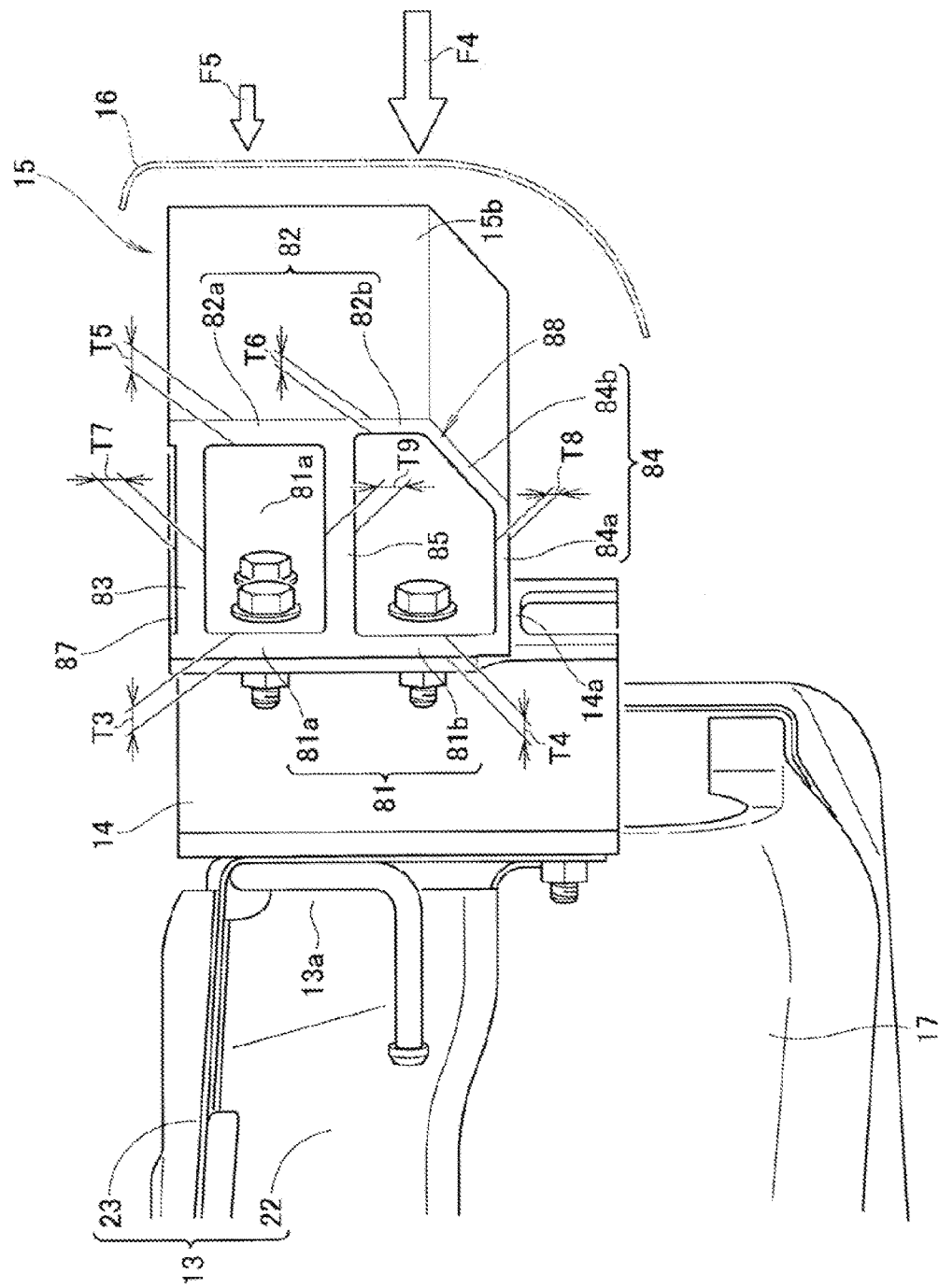

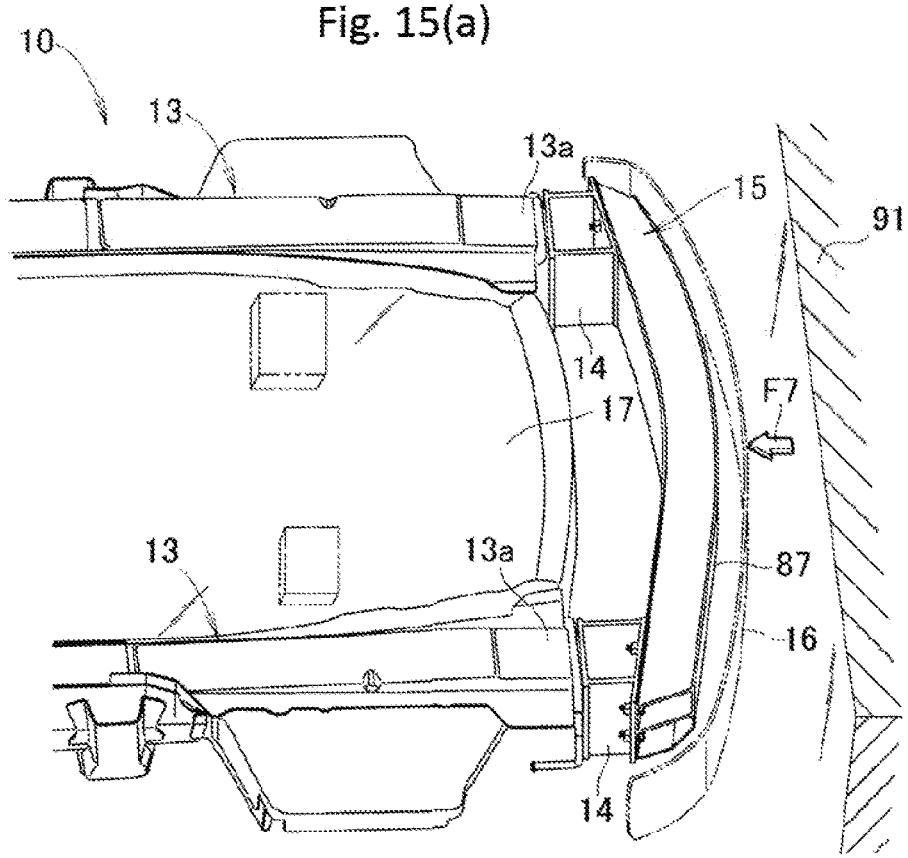
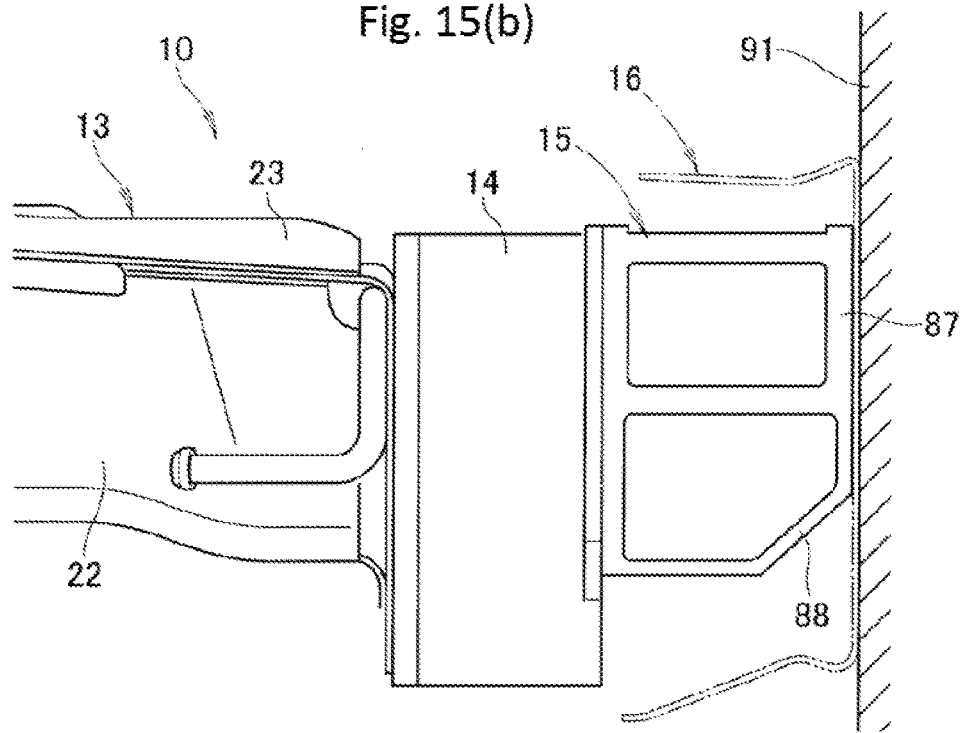

VEHICLE REAR BODY STRUCTURE

CROSS-REFERENCE OF RELATED APPLICATION

This application claims priority of Japanese Patent Application No. 2015-165732 filed in Japan on Aug. 25, 2015, the entire contents of which are incorporated herein by reference.

TECHNICAL FIELD

The present invention relates to a vehicle rear body structure in which a bumper beam spans rear end parts of left and right rear frames.

BACKGROUND OF THE INVENTION

There is known a vehicle rear body structure in which a front buckling reference hole and a bending bead are formed on the front side of each of left and right rear frames with respect to a vehicle body, and a rear buckling reference hole and a bending bead are formed on the rear side thereof with respect to the vehicle body. The bending bead on the vehicle body front side is formed inside the front buckling reference hole in a vehicle widthwise direction. In addition, the bending bead on the vehicle body rear side is formed outside the rear buckling reference hole in the vehicle widthwise direction (see Japanese Patent Application Publication No. 2013-233898, for example).

According to this vehicle rear body structure, the bending bead on the vehicle body front side and the bending bead on the vehicle body rear side are formed in a staggered pattern in the vehicle widthwise direction. This enables the rear frame to be bent in a horizontal direction by an impact load input to a rear bumper beam and thus to absorb the impact load input to the rear bumper beam.

Here, some automobiles have a gasoline tank, an intelligent power unit (IPU), and the like arranged between left and right rear frames. An IPU is an in-vehicle inverter used in hybrid electric vehicles (HEVs) and configured to improve fuel consumption and reduce exhaust gas emissions.

It is conceivable in such automobiles that, when each rear frame is bent in the horizontal direction by an impact load input to a rear bumper beam, the rear frame thus bent may come into contact with the gasoline tank, the IPU, and the like. For this reason, in order to prevent them from being damaged by such a contact, their installation locations are limited.

In addition, to prevent the bent rear frame from coming into contact with the gasoline tank, the IPU, and the like might become a hindrance in reserving a certain amount of deformation of the rear frame.

SUMMARY OF INVENTION

A challenge of the present invention is to provide a vehicle rear body structure capable of preventing a rear frame from coming into contact with a gasoline tank, an IPU, and the like and capable of reserving a certain amount of deformation of the rear frame.

A first embodiment according to the present invention provides a vehicle rear body structure including: rear frames that are arranged on left and right sides of a body rear part, and that are each formed to extend in a longitudinal direction with respect to a vehicle body (a vehicle front-rear direction) and have a closed section; and a bumper beam that spans rear end parts of the respective rear frames and thus extends in a vehicle widthwise direction, characterized in that each rear frame has a lower half part that is formed to have a larger thickness dimension than an upper half part thereof, and has a first soft zone, a second soft zone, and a third soft zone that are arranged in the rear frame sequentially from a front of the vehicle body to a rear of the vehicle body so as to be spaced from one another and that have lower strength than other portions of the rear frame, the second soft zone is disposed between the first soft zone and the third soft zone, the second soft zone is formed in a ring shape throughout a circumference of the rear frame, and the first soft zone and the third soft zone are arranged in the lower half part of the rear frame.

In the above manner, the lower half part of the rear frame is formed to have a larger thickness dimension than an upper half part thereof. In addition, the second soft zone located at the middle is formed in a ring shape throughout the circumference of the rear frame. Accordingly, in the second soft zone, the rigidity of the lower half part is kept low, and the rigidity of the upper half part is kept lower than that of the lower half part. Thereby, when an impact load is input from behind the vehicle body to the rear frame, the second soft zone can be stably bent downward about the upper half part of the second soft zone so as to be folded into a valley fold.

Further, the first soft zone and the third soft zone are arranged in the lower half part of the rear frame. Accordingly, the rigidity of the first soft zone and the third soft zone is kept low in the lower half part of the rear frame. Thereby, when an impact load is input from behind the vehicle body to the rear frame, the first soft zone can be bent upward about the lower half part of the first soft zone so as to be folded into a mountain fold, and likewise the third soft zone can be bent upward about the lower half part of the third soft zone so as to be folded into a mountain fold.

In the above manner, the second soft zone is formed in a ring shape throughout the circumference of the rear frame so that the second soft zone is stably bent into a valley fold. Accordingly, the rear frame can be bent in a vertical direction reliably at the first soft zone, the second soft zone, and the third soft zone.

Thereby, it is possible to inhibit the rear frame from coming into contact with a gasoline tank, an IPU, and the like arranged between the left and right rear frames, and thereby to protect the gasoline tank, the IPU, and the like.

In addition, by inhibiting the contact of the rear frame with the gasoline tank, the IPU, and the like, it is possible to reserve a certain amount of deformation of the rear frame. This enables the rear frame to excellently absorb an impact load having been input thereto from behind the vehicle body by the deformation of the rear frame.

Further, since the second soft zone is formed in a ring shape throughout the circumference of the rear frame, the rigidity of the lower half part is kept low at the second soft zone. Accordingly, even if the lower half part of the rear frame is formed to have a thickness dimension larger than the upper half part thereof, the rear frame can be reliably bent in the vertical direction.

Thereby, the lower half part and the upper half part of the rear frame can have different thickness dimensions, which enables a reduction in weight of the rear frame.

A second embodiment according to the invention, it is preferable that the rear frame has the lower half part formed of a lower member and the upper half part formed of an upper member, and is thus divided into the lower member and the upper member, and the lower member and the upper member together form the closed section by placing the upper member on the lower member from above.

In the above manner, the lower half part is formed of the lower member and the upper half part is formed of the upper member. Accordingly, in the second soft zone, the rigidity of the lower member is kept low, and the rigidity of the upper member is kept lower than that of the lower member. In addition, the second soft zone is formed in a ring shape throughout the circumference of the rear frame.

Thereby, when an impact load is input from behind the vehicle body to the rear frame, the second soft zone can be stably bent downward about the upper member of the second soft zone so as to be folded into a valley fold.

Further, the first soft zone and the third soft zone are arranged in the lower member. Accordingly, the rigidity of the first soft zone and the third soft zone is kept low in the lower member. Thereby, when an impact load is input from behind the vehicle body to the rear frame, the first soft zone can be bent upward about the lower member of the first soft zone so as to be folded into a mountain fold, and likewise the third soft zone can be bent upward about the lower member of the third soft zone so as to be folded into a mountain fold.

In the above manner, the second soft zone is formed in a ring shape throughout the circumference of the rear frame so that the second soft zone is stably bent into a valley fold. Accordingly, the rear frame can be bent in a vertical direction reliably at the first soft zone, the second soft zone, and the third soft zone.

Thereby, it is possible to inhibit the rear frame from coming into contact with a gasoline tank, an IPU, and the like arranged between the left and right rear frames, and thereby to protect the gasoline tank, the IPU, and the like.

In addition, by inhibiting the contact of the rear frame with the gasoline tank, the IPU, and the like, it is possible to reserve a certain amount of deformation of the rear frame. This enables the rear frame to excellently absorb an impact load, having been input thereto from behind the vehicle body, by the deformation of the rear frame.

Further, since the second soft zone is formed in a ring shape throughout the circumference of the rear frame, the rigidity of the lower member is kept low at the second soft zone. Accordingly, even if the lower member of the rear frame is formed to have a thickness dimension larger than the upper member thereof, the rear frame can be reliably bent in the vertical direction.

Thereby, the lower member and the upper member of the rear frame can have different thickness dimensions, which enables a reduction in weight of the rear frame.

A third embodiment according to the invention, it is preferable that the rear frame has a sectional area of the closed section that becomes continuously smaller from the rear end part of the rear frame to the third soft zone.

In the above manner, the sectional area of the closed section of the rear frame becomes continuously smaller from the rear end part of the rear frame to the third soft zone. Accordingly, it is possible to concentrate stresses on the third soft zone when an impact load is input from behind the vehicle body to the rear frame.

Thereby, it is possible to induce the bending of the third soft zone and bend the third soft zone, the second soft zone, and the first soft zone sequentially in the vertical direction.

A fourth embodiment according to the invention, it is preferable that the first soft zone has a width dimension in the longitudinal direction with respect to the vehicle body larger than the second soft zone and the third soft zone.

In the above manner, the width dimension of the first soft zone in the longitudinal direction with respect to the vehicle body is set larger than that of the second soft zone and the third soft zone. Accordingly, the first soft zone can be stably bent upward into a mountain fold after the third soft zone and the second soft zone are bent. This enables the rear frame to more excellently absorb an impact load, having been input thereto from behind the vehicle body, by the deformation of the rear frame.

A fifth embodiment according to the invention, it is preferable that the upper member has: a top part that extends in the longitudinal direction with respect to the vehicle body; an upper inner wall that juts out downward from an inner edge of the top part; an upper outer wall that juts out downward from an outer edge of the top part; an upper inner flange that juts out inward in the vehicle widthwise direction from a lower edge of the upper inner wall; and an upper outer flange that juts out outward in the vehicle widthwise direction from a lower edge of the upper outer wall, with the top part, the upper inner wall, the upper outer wall, the upper inner flange, and the upper outer flange, the upper member is formed to have a substantially hat-shaped cross section bulging upward, crossing between the top part and the upper inner wall forms an inner upper contour extending in the longitudinal direction with respect to the vehicle body, crossing between the top part and the upper outer wall forms an outer upper contour extending in the longitudinal direction with respect to the vehicle body, and an upper concave part that is concaved toward an inside of the rear frame is provided in the outer upper contour at the second soft zone.

Here, when an impact load is input from behind the vehicle body to the center of the bumper beam in the vehicle widthwise direction, for example, a smaller load than a load to be input to the inner upper contour of the upper member is input to the outer upper contour of the upper member. Thus, it is conceivable that the outer upper contour at the second soft zone is difficult to bend favorably as compared with the inner upper contour.

To deal with this, in the fifth embodiment, the upper concave part is provided in the outer upper contour at the second soft zone. Accordingly, it is possible to concentrate stresses on the upper concave part when an impact load is input to the bumper beam from behind the vehicle body and thus to induce the bending of the outer upper contour at the upper concave part. Thereby, it is possible to bend the outer upper contour at the second soft zone favorably in the same way as the inner upper contour, and thus to bend the second soft zone stably.

A sixth embodiment according to the invention, it is preferable that the lower member has: a bottom part that extends in the longitudinal direction with respect to the vehicle body; a lower inner wall that juts out upward from an inner edge of the bottom part; a lower outer wall that juts out upward from an outer edge of the bottom part; a lower inner flange that juts out inward in the vehicle widthwise direction from an upper edge of the lower inner wall; and a lower outer flange that juts out outward in the vehicle widthwise direction from an upper edge of the lower outer wall, with the bottom part, the lower inner wall, the lower outer wall, the lower inner flange, and the lower outer flange, the lower member is formed to have a substantially hat-shaped cross section bulging downward, crossing between the lower inner wall and the lower inner flange forms an inner flange contour extending in the longitudinal direction with respect to the vehicle body, crossing between the lower outer wall and the lower outer flange forms an outer flange contour extending in the longitudinal direction with respect to the vehicle body, and flange convex parts that protrude toward an outside of the rear frame are arranged respectively in the inner flange contour and the outer flange contour at the second soft zone.

In the above manner, the flange convex parts are arranged respectively in the inner flange contour and the outer flange contour at the second soft zone. Accordingly, it is possible to concentrate stresses on the flange convex parts when an impact load is input from behind the vehicle body to the bumper beam and thus to induce the bending of the inner flange contour and the outer flange contour at the flange convex parts. Thereby, it is possible to bend the second soft zone more stably at the flange convex parts.

A seventh embodiment according to the invention, it is preferable that the lower member is provided at the bottom part thereof with beads that extend in the longitudinal direction with respect to the vehicle body between adjacent ones of the first soft zone, the second soft zone, and the third soft zone.

In the above manner, the beads are provided at the bottom part of the lower member and between adjacent soft zones, and the beads extend in the longitudinal direction with respect to the vehicle body. Accordingly, areas between the adjacent soft zones can be reinforced by the beads.

Thereby, it is possible to prevent the bending of the areas between the adjacent soft zones and bend the rear frame reliably at the first soft zone, the second soft zone, and the third soft zone when an impact load is input from behind the vehicle body to the bumper beam.

An eight embodiment according to the invention, it is preferable that, in the lower member, crossing between the bottom part and the lower inner wall forms an inner lower contour extending in the longitudinal direction with respect to the vehicle body, and crossing between the bottom part and the lower outer wall forms an outer lower contour extending in the longitudinal direction with respect to the vehicle body, and bottom concave parts that are concaved toward the inside of the rear frame are arranged respectively in the inner lower contour and the outer lower contour at the first soft zone.

In the above manner, the bottom concave parts are arranged respectively in the inner lower contour and the outer lower contour at the first soft zone. Accordingly, it is possible to concentrate stresses on the bottom concave parts when an impact load is input from behind the vehicle body to the bumper beam and thus to induce the bending of the inner lower contour and the outer lower contour at the bottom concave parts. Thereby, it is possible to bend the first soft zone stably at the bottom concave parts.

A ninth embodiment according to the invention, it is preferable that the bumper beam has: a beam front wall that is provided on a front side of the vehicle body; a beam rear wall that is provided behind the beam front wall with respect to the vehicle body; a beam upper part that is provided on upper edges of the respective beam front wall and beam rear wall; a beam lower part that is provided on lower edges of the respective beam front wall and beam rear wall; and a beam partition part that is disposed between the beam upper part and the beam lower part, and is provided at a center between the beam front wall and the beam rear wall, with the beam front wall, the beam rear wall, the beam upper part, the beam lower part, and the beam partition part, the bumper beam is formed to have a cross section substantially in a shape of a letter "8", an upper front wall located in an upper part of the beam front wall with respect to the beam partition part, an upper rear wall located in the upper part of the beam rear wall with respect to the beam partition part, the beam upper part, and the beam partition part together form an upper beam part, a lower front wall located in a lower part of the beam front wall with respect to the beam partition part, a lower rear wall located in the lower part of the beam rear wall with respect to the beam partition part, and the beam lower part together form a lower beam part, and the lower beam part has a thickness dimension smaller than the upper beam part.

In this respect, it is conceivable that the bumper beam is used for sports utility vehicles (SUVs) with a high vehicle height. Because such an SUV has a high vehicle height, the bumper beam is placed at a higher position than it is in normal automobiles. For this reason, when a normal automobile collides with this SUV from behind the vehicle body (such a collision is hereinafter referred to as a "high-speed collision") while the SUV is running, an impact load is input to the lower half part of the bumper beam of the SUV.

Against this background, in the ninth embodiment, the thickness dimension of the lower beam part of the bumper beam is set smaller than that of the upper beam part of the bumper beam. Hence, when an impact load is input to the lower beam part due to the high-speed collision, it is possible to absorb the impact load favorably by the crush of the lower beam part. Thereby, it is possible to use the lower beam part to adjust a load to be transmitted from the lower beam part to the rear frame, and thus to adjust (control) the deformation mode of the rear frame.

Besides, the bumper beam is covered with the bumper from behind the vehicle. Accordingly, when the bumper collides with a wall part or the like during parking of the SUV in a garage in back low-speed driving (such a collision is hereinafter referred to as a "low-speed collision"), an impact load is input to the entire face of the bumper beam through the bumper.

Against this background, the thickness dimension of the upper beam part of the bumper beam is set larger than that of the lower beam part of the bumper beam. Thereby, it is possible to use the bumper beam to support the impact load having been input to the entire face of the bumper beam due to the low-speed collision, and thus to prevent deformation of a body frame member such as the rear frame.

In this way, the thickness dimension of the lower beam part of the bumper beam is set smaller than that of the upper beam part of the bumper beam in order for the lower beam part and the upper beam part to have different rigidity. This enables the bumper beam to be ready for both collisions during driving of the SUV or parking of the SUV in a garage, that is to say, enables the bumper beam to have both high-speed collision performance and light-collision performance.

Effect of the Invention

According to the embodiments of present invention, by deforming the rear frame in the vertical direction, it is possible to inhibit the rear frame from coming into contact with a gasoline tank, an IPU, and the like, and thereby to protect the gasoline tank, the IPU, and the like and reserve a certain amount of deformation of the rear frame.

BRIEF DESCRIPTION OF THE DRAWINGS

FIG. 10 is a view of FIG. 9 as seen in the direction of the arrow 10.

FIGS. 15(a) and 15(b) are views explaining an example where an impact load that is input to the vehicle rear body structure of Embodiment 1 due to a low-speed collision is supported by the bumper beam.

DETAILED DESCRIPTION OF THE INVENTION

Best modes for carrying out the present invention are described below based on the accompanying drawings. Note that the terms "front (Fr)", "rear (Rr)", "left (L)", and "right (R)" are defined based on directions viewed from a driver.

Embodiment 1

A vehicle rear body structure 10 according to Embodiment 1 is described.

Figure 1:
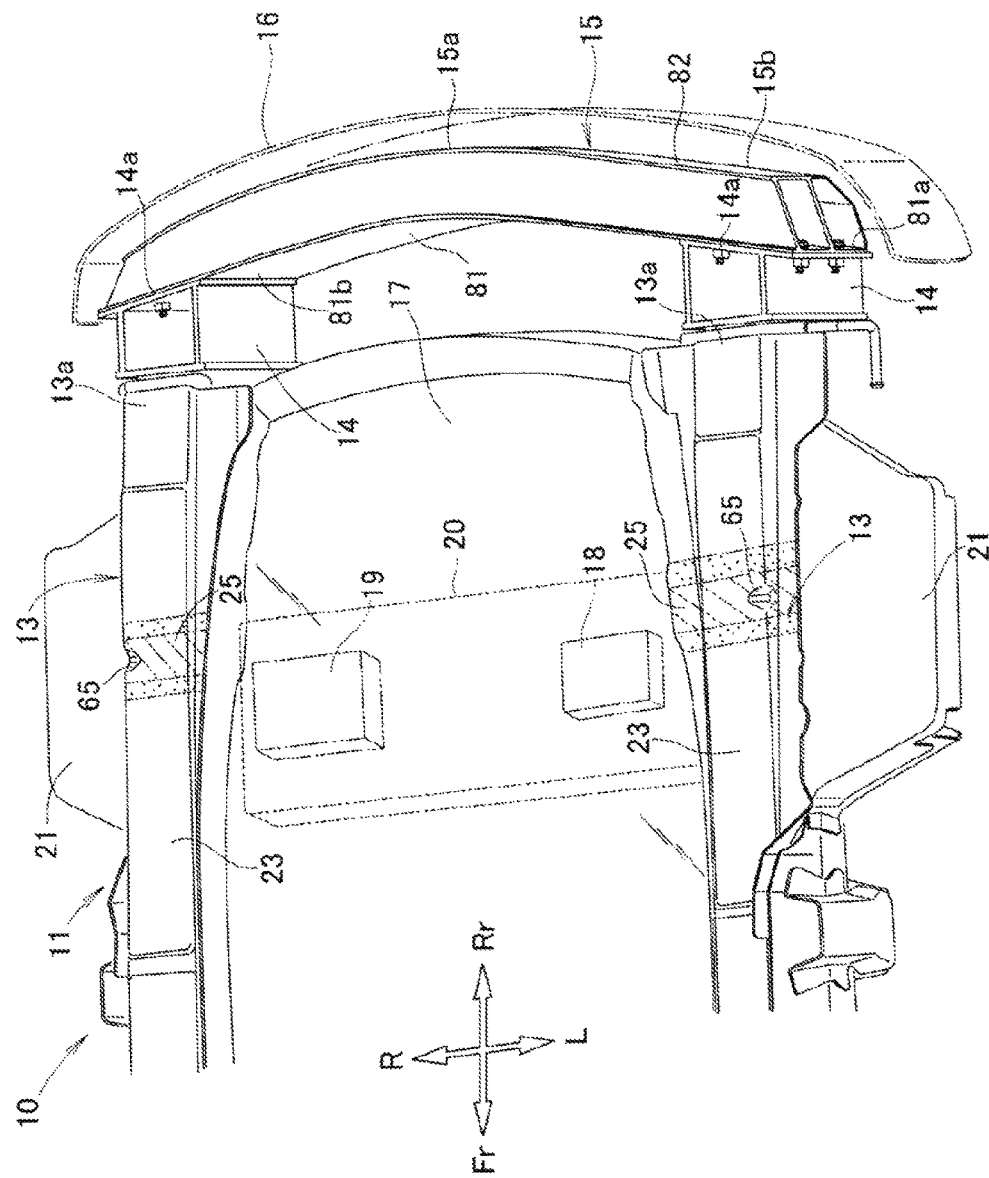
FIG. 1 is a perspective view illustrating a vehicle rear body structure of Embodiment 1 according to the present invention.

As illustrated in FIG. 1, the vehicle rear body structure 10 includes: a left rear frame 13 and a right rear frame 13 that are arranged on left and right sides of a body rear part 11; a left connection part 14 that is provided on a rear end part 13a of the left rear frame 13; a right connection part 14 that is provided on a rear end part 13a of the right rear frame 13; a bumper beam 15 that is attached to the left and right connection parts 14 from behind a vehicle body; and a bumper 16 that covers the bumper beam 15 from behind the vehicle body.

A goods storage panel (tire pan) 17 is provided between the left rear frame 13 and the right rear frame 13. In addition, an IPU 18, a high-voltage battery 19, and the like are arranged in the goods storage panel 17. The IPU 18 is an inverter that is used in hybrid electric vehicles and configured to improve fuel consumption and reduce exhaust gas emissions.

Further, a gasoline tank 20 is provided below the goods storage panel 17.

Besides, side panels 21 are respectively arranged on the left rear frame 13 and the right rear frame 13.

This vehicle rear body structure 10 is used for sports utility vehicles (SUVs) with a high vehicle height, for example. Hence, the bumper beam 15 is placed at a higher position than normal automobiles.

Note that the vehicle rear body structure 10 has a substantially symmetrical structure. Accordingly, left-side members and right-side members are given the same reference numerals, and the left-side members are described in detail and the right-side members are not described.

Figure 2:
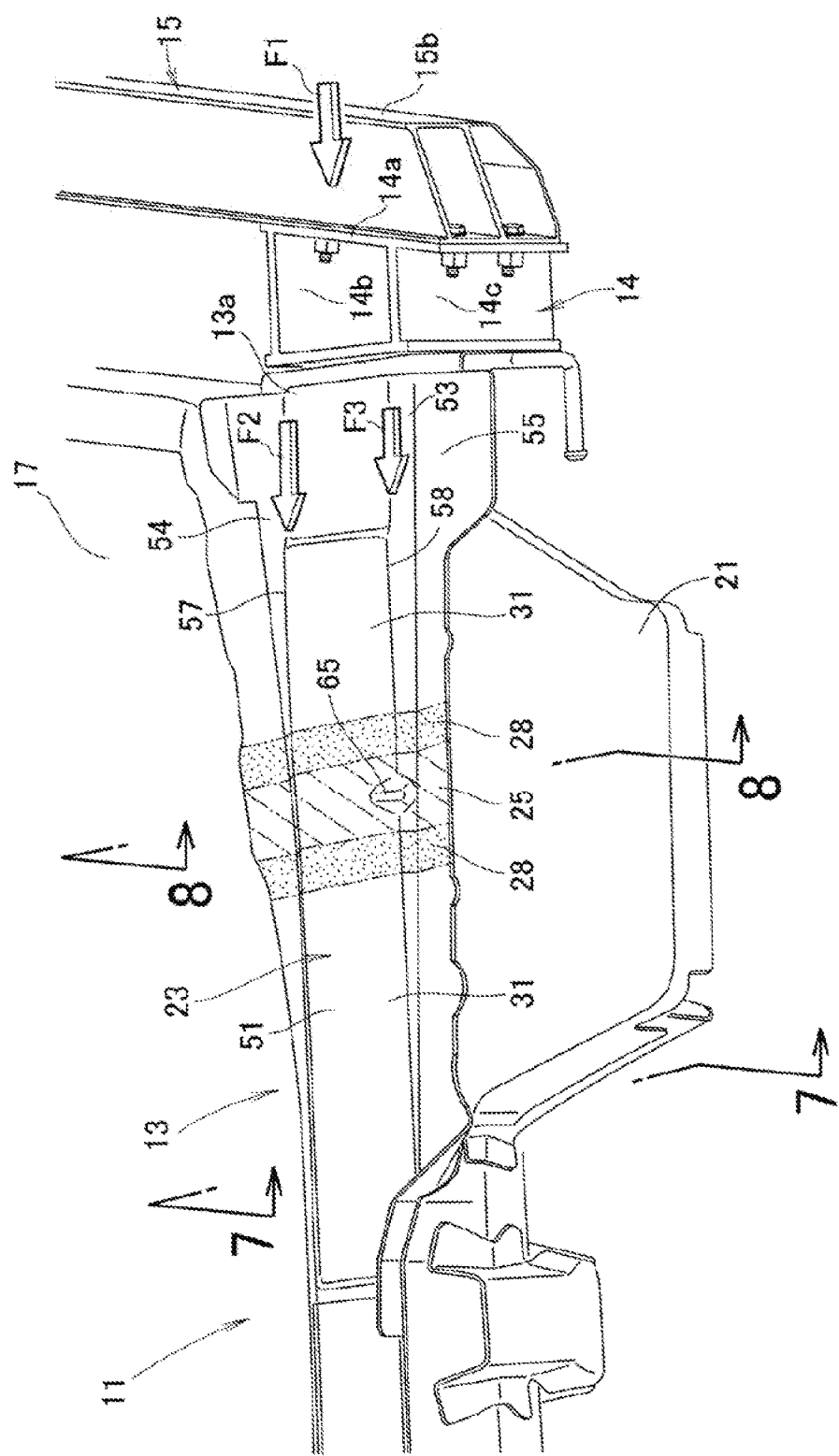
FIG. 2 is a perspective view illustrating a left side part of the vehicle rear body structure in FIG. 1.
Figure 3:
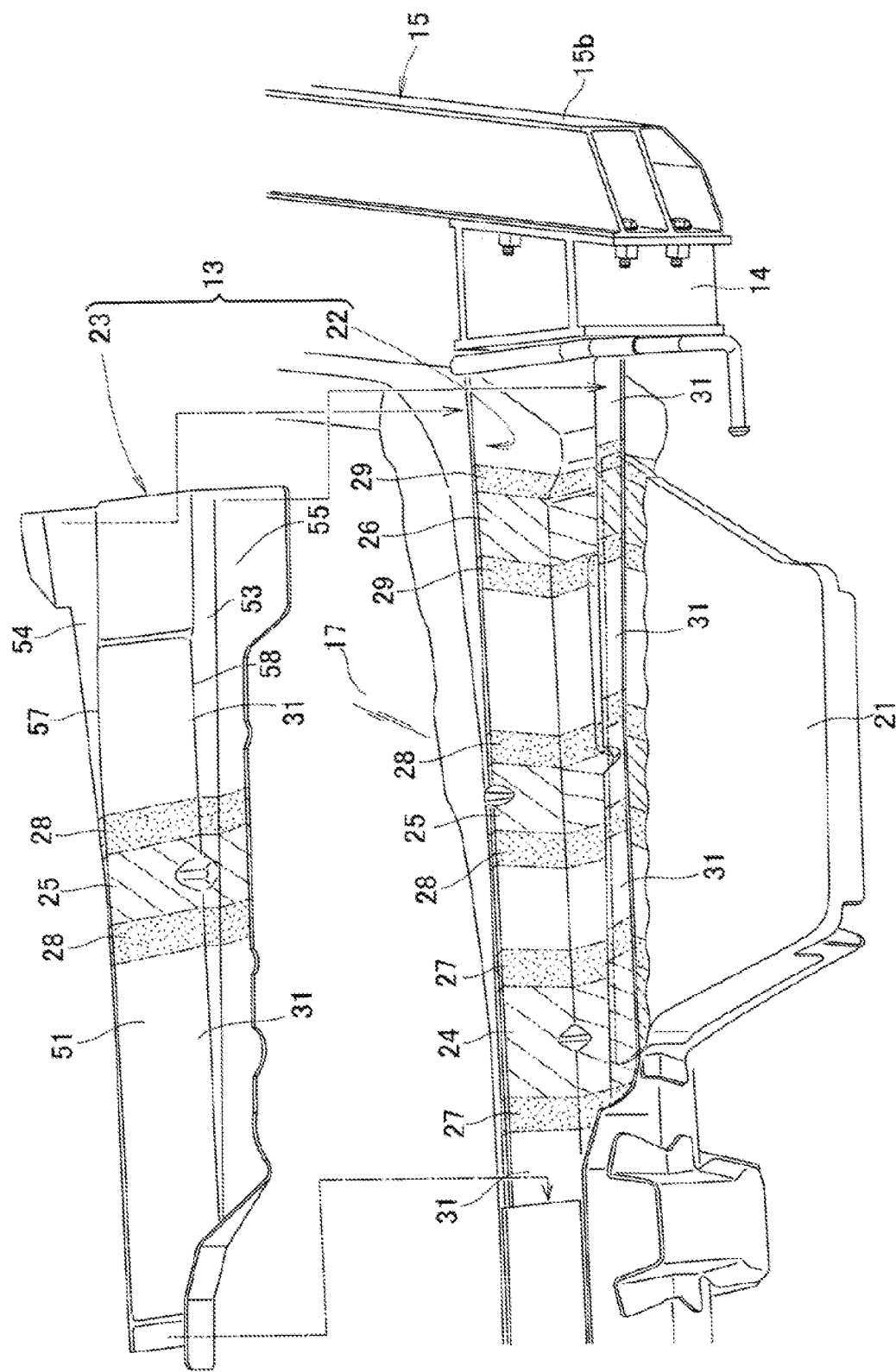
FIG. 3 is an exploded perspective view illustrating the left side part of the vehicle rear body structure in FIG. 2.

As illustrated in FIGS. 2 and 3, the left rear frame 13 extends in the longitudinal direction with respect to the vehicle body while being placed on the left side of the body rear part 11, and is divided into a lower member 22 and an upper member 23. In other words, the left rear frame 13 includes: the lower member 22 that forms a lower half part of the left rear frame 13; and the upper member 23 that forms an upper half part of the left rear frame 13.

The lower member 22 and the upper member 23 are formed by hot-stamp molding, for example. Hot-stamp molding is a commonly known technique as disclosed in International Patent Application Publication No. WO2015/001114, the entire contents of which are incorporated herein by reference.

A first soft zone 24, a second soft zone 25, and a third soft zone 26 are arranged in the left rear frame 13 sequentially from the front of the vehicle body to the rear of the vehicle body so as to be spaced from one another.

The first soft zone 24 is formed on the front side of the vehicle body, and the third soft zone 26 is formed on the rear side of the vehicle body. Further, the second soft zone 25 is formed between the first soft zone 24 and the third soft zone 26.

First soft transition zones 27 are respectively arranged adjacent to the front and rear sides of the first soft zone 24. Second soft transition zones 28 are respectively arranged adjacent to the front and rear sides of the second soft zone 25. Third soft transition zones 29 are respectively arranged adjacent to the front and rear sides of the third soft zone 26.

Here, portions of the left rear frame 13 other than the first to third soft zones 24 to 26 and the first to third soft transition zones 27 to 29 are ultra-high-strength parts (other portions of the rear frame) 31 having a tensile strength over 1400 Mpa.

Each of the first soft zone 24, the second soft zone 25, and the third soft zone 26 is a high-strength part whose tensile strength is kept within a range of 500 to 1000 Mpa that is lower than the ultra-high-strength part 31.

Each of the first soft transition zones 27, the second soft transition zones 28, and the third soft transition zones 29 is a strength transition part whose strength transitions gently between the tensile strength (1400 Mpa) and the tensile strength (500 to 1000 Mpa).

Figure 4:
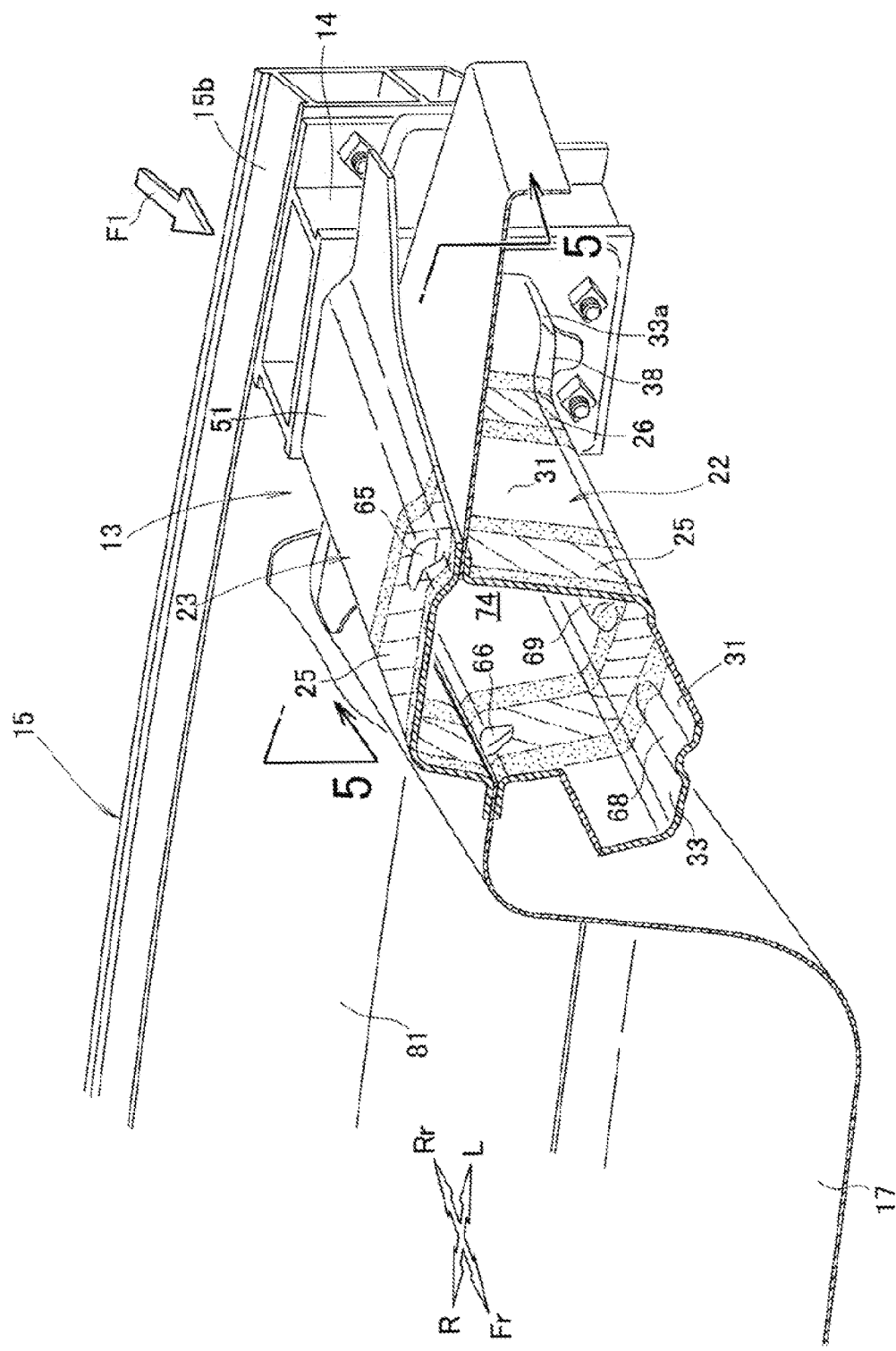
FIG. 4 is a perspective view illustrating a state where the left side part of the vehicle rear body structure in FIG. 3 is broken substantially at the center thereof in a longitudinal direction with respect to a vehicle body.
Figure 5:
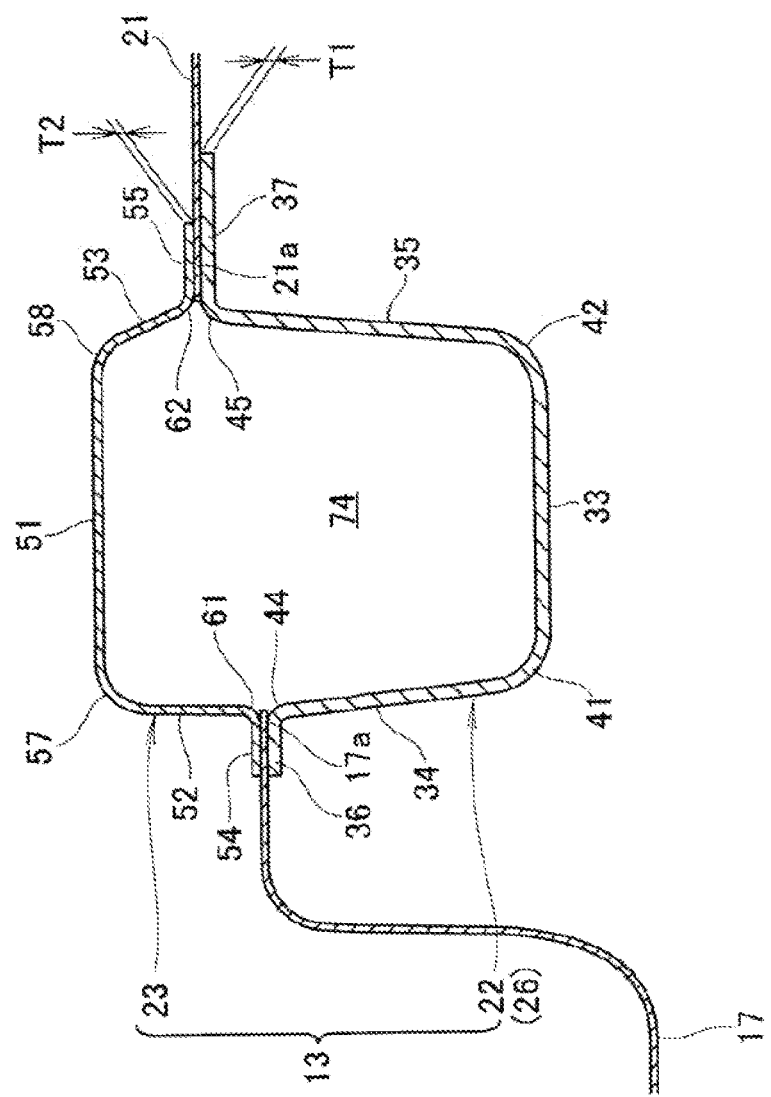
FIG. 5 is a sectional view taken along the line 5-5 in FIG. 4.

As illustrated in FIGS. 4 and 5, the lower member 22 has: a bottom part 33; a lower inner wall 34; a lower outer wall 35; a lower inner flange 36; and a lower outer flange 37. The lower member 22 is formed to have a thickness dimension T1. The thickness dimension T1 of the lower member 22 is larger than a thickness dimension T2 of the upper member 23.

The bottom part 33 extends in the longitudinal direction with respect to the vehicle body while being placed horizontally, and has a bottom tilt part 38 (see also FIG. 9) near its rear end part 33a. The bottom tilt part 38 is formed to incline upward from the rear end part 33a of the bottom part 33 to the third soft zone 26.

The lower inner wall 34 juts out upward from an inner edge of the bottom part 33 and thereby stands on the inner side in the vehicle widthwise direction. The lower outer wall 35 juts out upward from an outer edge of the bottom part 33 and thereby stands on the outer side in the vehicle widthwise direction.

The lower inner flange 36 juts out inward in the vehicle widthwise direction substantially horizontally from an upper edge of the lower inner wall 34. The lower outer flange 37 juts out outward in the vehicle widthwise direction substantially horizontally from an upper edge of the lower outer wall 35.

With the bottom part 33, the lower inner wall 34, the lower outer wall 35, the lower inner flange 36, and the lower outer flange 37, the lower member 22 is formed to have a substantially hat-shaped cross section bulging downward.

In addition, the crossing between the bottom part 33 and the lower inner wall 34 forms an inner lower contour 41 extending in the longitudinal direction with respect to the vehicle body. Likewise, the crossing between the bottom part 33 and the lower outer wall 35 forms an outer lower contour 42 extending in the longitudinal direction with respect to the vehicle body.

Further, the crossing between the lower inner wall 34 and the lower inner flange 36 forms a lower inner flange contour (inner flange contour) 44 extending in the longitudinal direction with respect to the vehicle body. Likewise, the crossing between the lower outer wall 35 and the lower outer flange 37 forms a lower outer flange contour (outer flange contour) 45 extending in the longitudinal direction with respect to the vehicle body.

The upper member 23 is formed to have the thickness dimension T2, and has: a top part 51; an upper inner wall 52; an upper outer wall 53; an upper inner flange 54; and an upper outer flange 55. The top part 51 extends in the longitudinal direction with respect to the vehicle body while being placed horizontally. The upper inner wall 52 juts out downward from an inner edge of the top part 51 and thereby droops on the inner side in the vehicle widthwise direction. The upper outer wall 53 juts out downward from an outer edge of the top part 51 and thereby droops on the outer side in the vehicle widthwise direction.

The upper inner flange 54 juts out inward in the vehicle widthwise direction substantially horizontally from a lower edge of the upper inner wall 52. The upper outer flange 55 juts out outward in the vehicle widthwise direction substantially horizontally from a lower edge of the upper outer wall 53.

With the top part 51, the upper inner wall 52, the upper outer wall 53, the upper inner flange 54, and the upper outer flange 55, the upper member 23 is formed to have a substantially hat-shaped cross section bulging upward.

In addition, the crossing between the top part 51 and the upper inner wall 52 forms an inner upper contour 57 extending in the longitudinal direction with respect to the vehicle body. Likewise, the crossing between the top part 51 and the upper outer wall 53 forms an outer upper contour 58 extending in the longitudinal direction with respect to the vehicle body.

Further, the crossing between the upper inner wall 52 and the upper inner flange 54 forms an upper inner flange contour 61 extending in the longitudinal direction with respect to the vehicle body. Likewise, the crossing between the upper outer wall 53 and the upper outer flange 55 forms an upper outer flange contour 62 extending in the longitudinal direction with respect to the vehicle body.

The upper member 23 is laid on the lower member 22 from above. The upper inner flange 54 and the lower inner flange 36 are joined by spot welding with a flange 17a of the goods storage panel 17 interposed between these upper and lower inner flanges 54, 36.

In addition, the upper outer flange 55 and the lower outer flange 37 are joined by spot welding with an inner edge 21a of the side panel 21 interposed between these upper and lower outer flanges 55, 37.

Accordingly, the upper member 23 is joined to the lower member 22 while being laid thereon from above. Thereby, with the upper member 23 and the lower member 22, the left rear frame 13 is formed to have a substantially rectangular closed section.

The first soft zone 24 (see FIG. 3), the second soft zone 25, and the third soft zone 26 are provided in the left rear frame 13.

Figure 6:
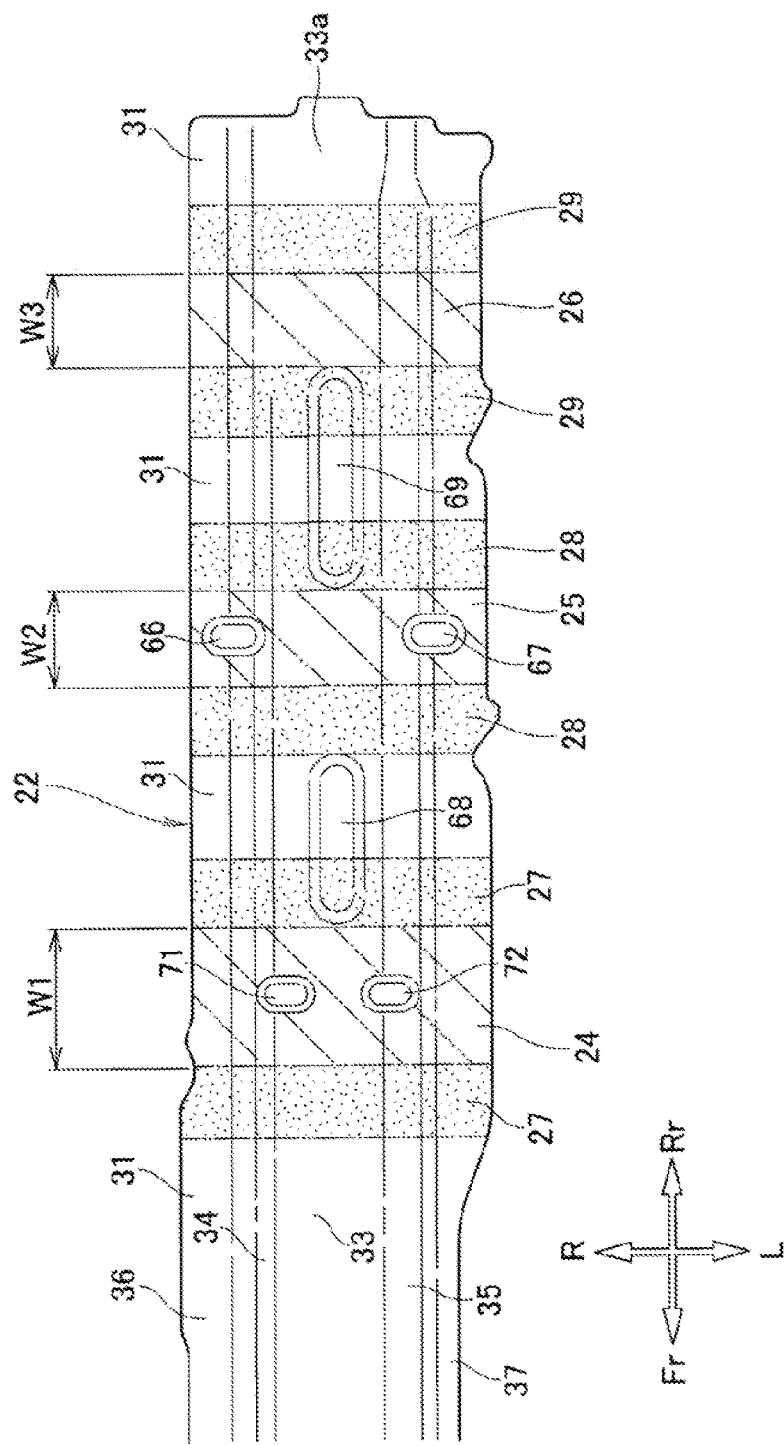
FIG. 6 is a plan view illustrating a lower member of a left rear frame in FIG. 3.
Figure 7:
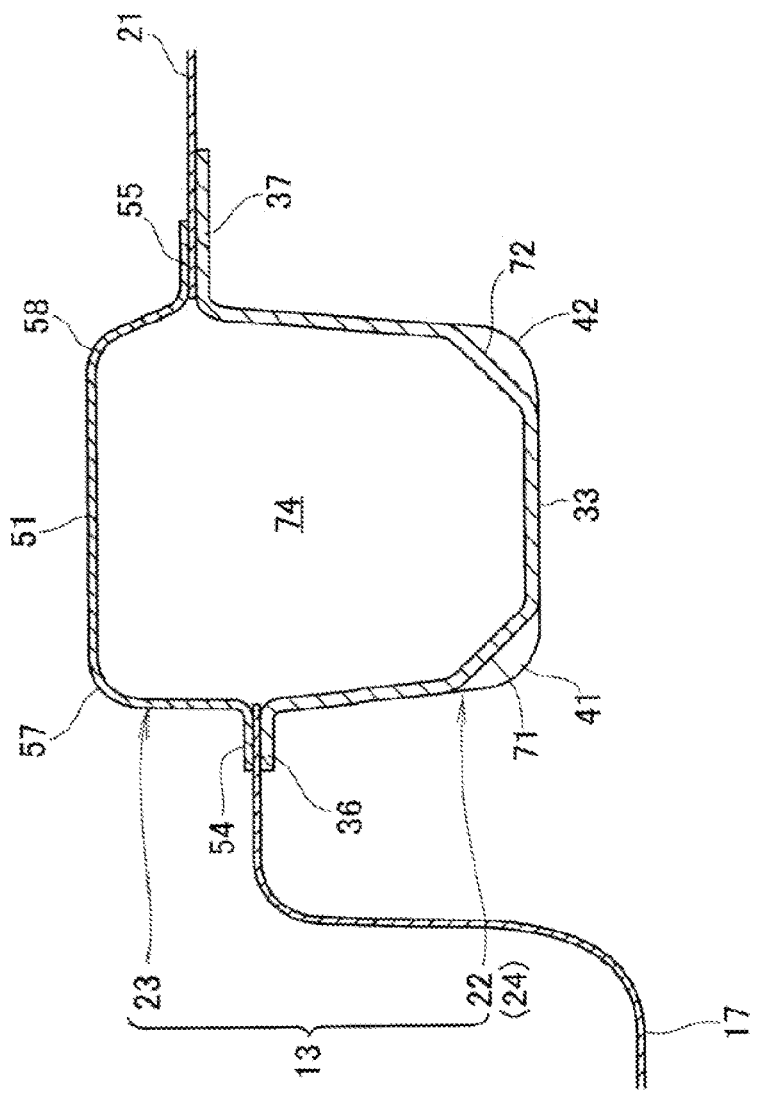
FIG. 7 is a sectional view taken along the line 7-7 in FIG. 2.

As illustrated in FIGS. 6 and 7, the first soft zone 24 is provided only in the lower member 22 and is thereby formed to have a substantially hat-shaped cross section in the same way as the lower member 22. The first soft zone 24 is formed to have a width dimension W1 in the longitudinal direction with respect to the vehicle body. The width dimension W1 of the first soft zone 24 is larger than a width dimension W2 of the second soft zone 25 and a width dimension W3 of the third soft zone 26.

Each first soft transition zone 27 adjacent to the first soft zone 24 is also provided only in the lower member 22 and is thereby formed to have a substantially hat-shaped cross section in the same way as the first soft zone 24.

Since the first soft zone 24 is formed only in the lower member 22, the rigidity of the first soft zone 24 is kept low in the lower member 22 (that is, the lower half part) of the left rear frame 13.

Thereby, when an impact load is input from behind the vehicle body to the rear end part 13a (see FIG. 2) of the left rear frame 13, the left rear frame 13 is bent upward about the first soft zone 24 so as to be folded into a mountain fold.

Figure 8:
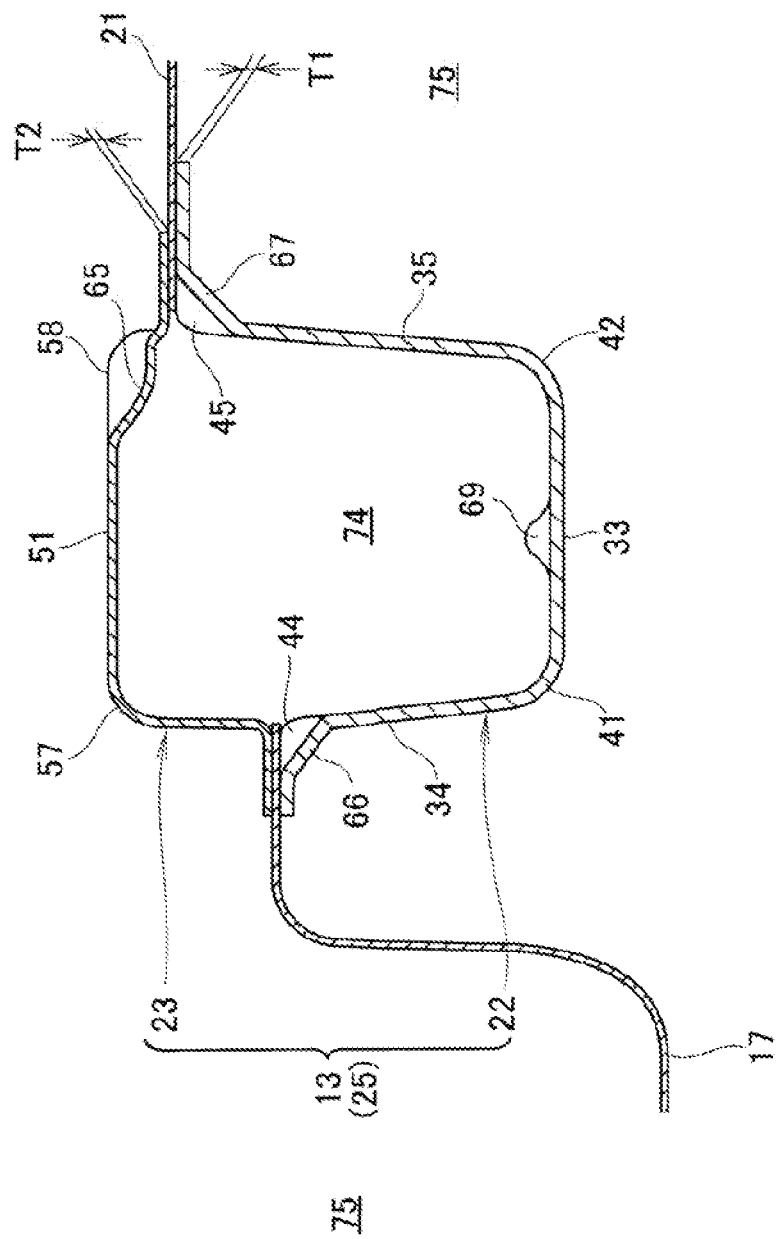
FIG. 8 is a sectional view taken along the line 8-8 in FIG. 2.

As illustrated in FIGS. 6 and 8, the second soft zone 25 is provided in the lower member 22 and the upper member 23 (that is, throughout the circumference of the left rear frame 13) and is thereby formed to have a ring shape in the same way as the left rear frame 13. The second soft zone 25 is formed to have the width dimension W2 in the longitudinal direction with respect to the vehicle body.

Each second soft transition zone 28 adjacent to the second soft zone 25 is also provided throughout the circumference of the left rear frame 13 and is thereby formed to have a ring shape in the same way as the second soft zone 25.

Here, the thickness dimension T1 of the lower member 22 is formed to be larger than the thickness dimension T2 of the upper member 23. Accordingly, in the second soft zone 25, the rigidity of the lower member 22 is kept low, and the rigidity of the upper member 23 is kept lower than the rigidity of the lower member 22.

Thereby, when an impact load is input from behind the vehicle body to the rear end part 13a (see FIG. 2) of the left rear frame 13, the left rear frame 13 is bent downward about the upper member 23 of the second soft zone 25 so as to be folded into a valley fold.

Moreover, since the second soft zone 25 is formed to have a ring shape, the rigidity of the lower member 22 is kept low.

Thereby, the left rear frame 13 is stably bent downward about the upper member 23 of the second soft zone 25 so as to be folded into a valley fold.

As illustrated in FIGS. 5 and 6, the third soft zone 26 is provided only in the lower member 22 in the same way as the first soft zone 24, and is thereby formed to have a substantially hat-shaped cross section in the same way as the lower member 22. The third soft zone 26 is formed to have the width dimension W3 in the longitudinal direction with respect to the vehicle body.

Each third soft transition zone 29 adjacent to the third soft zone 26 is also provided only in the lower member 22 and is thereby formed to have a substantially hat-shaped cross section in the same way as the third soft zone 26.

Since the third soft zone 26 is formed only in the lower member 22, the rigidity of the third soft zone 26 is kept low in the lower member 22 (that is, the lower half part) of the left rear frame 13.

Thereby, when an impact load is input from behind the vehicle body to the rear end part 13a (see FIG. 2) of the left rear frame 13, the left rear frame 13 is bent upward about the third soft zone 26 so as to be folded into a mountain fold.

In this way, since the second soft zone 25 is formed in a ring shape throughout the circumference of the left rear frame 13, the second soft zone 25 is stably bent into a valley fold. Moreover, since the first soft zone 24 and the third soft zone 26 are formed only in the lower member 22, each of the soft zones 24, 26 is bent into a mountain fold.

Thereby, the left rear frame 13 can be bent in the vertical direction reliably at the first soft zone 24, the second soft zone 25, and the third soft zone 26.

Further, since the second soft zone 25 is formed in a ring shape throughout the circumference of the left rear frame 13, the rigidity of the lower member 22 is kept low at the second soft zone 25. Accordingly, even if the lower member 22 is formed to have the thickness dimension T1 larger than the thickness dimension T2 of the upper member 23, the left rear frame 13 can be reliably bent in the vertical direction.

Thereby, the lower member 22 and the upper member 23 of the left rear frame 13 can have different thickness dimensions, which enables a reduction in weight of the left rear frame 13.

Figure 9:
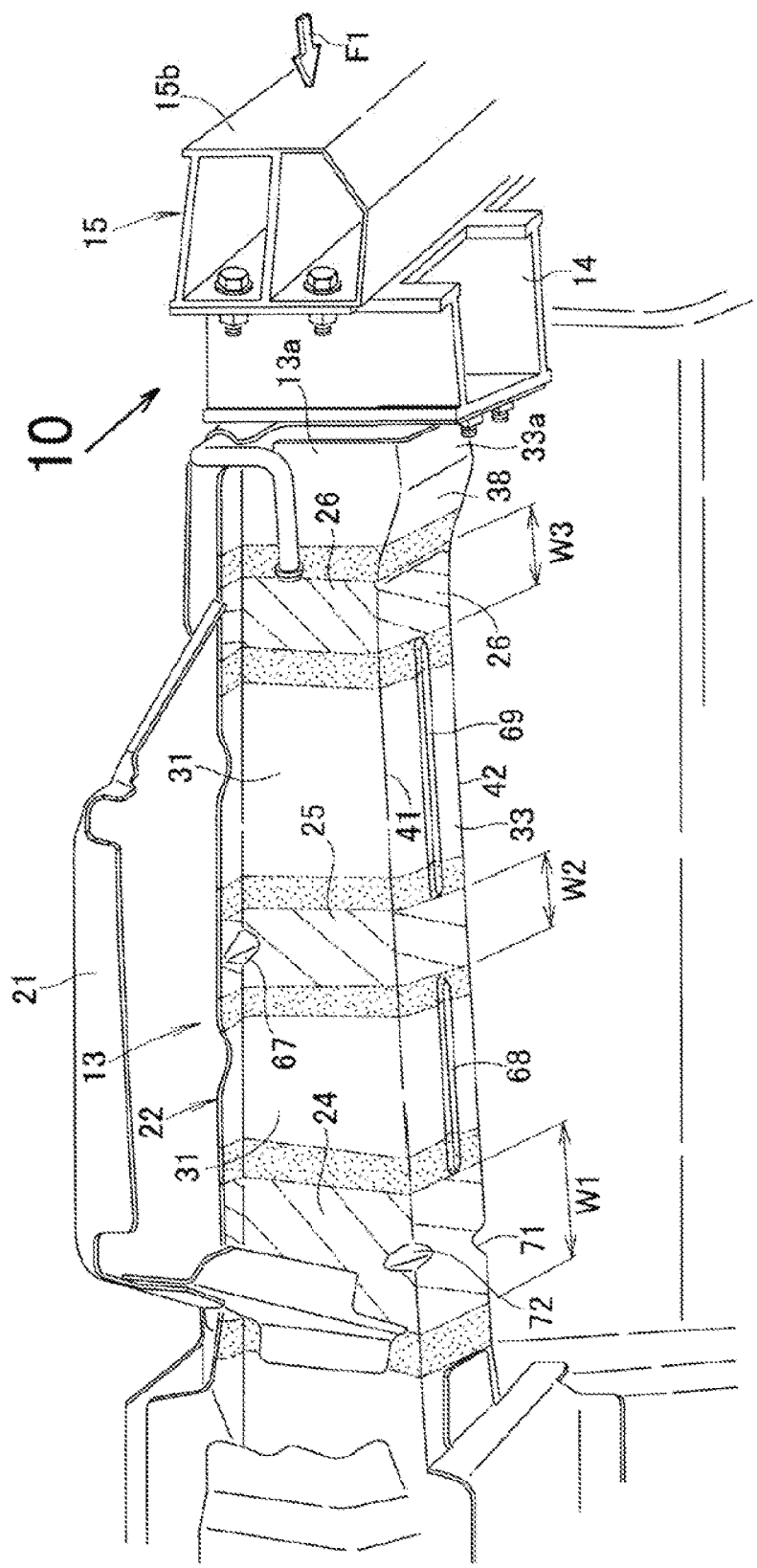
FIG. 9 is a perspective view illustrating the left side part of the vehicle rear body structure in FIG. 2 as seen from a rear lower side of a vehicle body.

Here, as illustrated in FIG. 9, the bottom tilt part 38 is formed in the bottom part 33 of the left rear frame 13 at a position near the rear end part 33a. Accordingly, the left rear frame 13 is formed so that the sectional area of its closed section becomes continuously smaller from the rear end part 13a of the left rear frame 13 to the third soft zone 26.

Thus, it is possible to concentrate stresses on the third soft zone 26 when an impact load is input from behind the vehicle body to the rear end part 13a of the left rear frame 13. This makes it possible to induce the bending of the third soft zone 26 smoothly.

In this way, by inducing the bending of the third soft zone 26 smoothly, it is possible to favorably bend the third soft zone 26, the second soft zone 25, and the first soft zone 24 sequentially in the vertical direction.

Since the width dimension W1 of the first soft zone 24 is set larger than those of the second soft zone 25 and the third soft zone 26, it is possible to reserve a large margin for bending of the first soft zone 24. Accordingly, the first soft zone 24 can be stably bent upward into a mountain fold after the third soft zone 26 and the second soft zone 25 are bent.

As illustrated in FIGS. 8 and 9, the left rear frame 13 has: an upper concave part 65 that is formed in an outer upper contour 58; an inner flange convex part 66 that is formed in the lower inner flange contour 44; an outer flange convex part 67 that is formed in the lower outer flange contour 45; a front bead 68 and a rear bead 69 that are formed in the bottom part 33; an inner bottom concave part 71 (see also FIG. 7) that is formed in the inner lower contour 41; and an outer bottom concave part 72 that is formed in the outer lower contour 42.

As illustrated in FIGS. 2 and 8, the upper concave part 65 is formed in the outer upper contour 58 at the second soft zone 25 so as to be concaved toward an inside 74 of the left rear frame 13. The reason why the upper concave part 65 is formed in the outer upper contour 58 at the second soft zone 25 is as follows.

Specifically, a rear wall 14a of the left connection part 14 tilts rearward with respect to the vehicle body toward the inner side in the vehicle widthwise direction. Because of the tilt of the rear wall 14a, an inner wall 14b of the left connection part 14 protrudes further rearward with respect to the vehicle body than an outer wall 14c thereof. In addition, the inner wall 14b is placed on an extended line of the inner upper contour 57, and the outer wall 14c is placed on an extended line of the outer upper contour 58.

Thus, when an impact load F1 is input from behind the vehicle body to a center 15a (see FIG. 1) of the bumper beam 15 in the vehicle widthwise direction or a left end part 15b of the bumper beam 15, for example, a load F3 to be input to the outer upper contour 58 is smaller than a load F2 to be input to the inner upper contour 57.

In this respect, even in a configuration where the rear wall 14a of the left connection part 14 is placed parallel with the vehicle widthwise direction, the load F3 on the outer upper contour 58 is smaller than the load F2 on the inner upper contour 57 when the impact load F1 is input from behind the vehicle body to the center 15a of the bumper beam 15 in the vehicle widthwise direction.

Since the load F3 on the outer upper contour 58 is smaller than the load F2 on the inner upper contour 57 in this manner, it is conceivable that the outer upper contour 58 at the second soft zone 25 is difficult to bend favorably as compared with the inner upper contour 57.

To deal with this, the upper concave part 65 is provided in the outer upper contour 58 at the second soft zone 25. Accordingly, it is possible to concentrate stresses on the upper concave part 65 when the load F3 is input to the outer upper contour 58 and thus to induce the bending of the outer upper contour 58 at the upper concave part 65.

Thereby, it is possible to bend the outer upper contour 58 at the second soft zone 25 favorably in the same way as the inner upper contour 57, and thus to bend the second soft zone 25 stably.

The inner flange convex part 66 is formed in the lower inner flange contour 44 at the second soft zone 25 so as to protrude toward an outside 75 of the left rear frame 13.

The outer flange convex part 67 is a portion symmetric to the inner flange convex part 66. In other words, the outer flange convex part 67 is formed in the lower outer flange contour 45 at the second soft zone 25 so as to protrude toward the outside 75 of the left rear frame 13.

Accordingly, it is possible to concentrate stresses on the inner flange convex part 66 and the outer flange convex part 67 when the impact load F1 is input from behind the vehicle body to the bumper beam 15 and thus to induce the bending of the lower inner flange contour 44 and the lower outer flange contour 45 at the flange convex parts 66, 67.

Thereby, it is possible to bend the second soft zone 25 more stably at the inner flange convex part 66 and the outer flange convex part 67.

As illustrated in FIGS. 4 and 9, the front bead 68 is formed in the bottom part 33 of the lower member 22 at the center in the vehicle widthwise direction between the first soft zone 24 and the second soft zone 25 (between the adjacent soft zones). Specifically, the front bead 68 is formed to bulge from the bottom part 33 toward the inside 74 of the left rear frame 13 and extends in the longitudinal direction with respect to the vehicle body.

Thus, an area of the bottom part 33 between the first soft zone 24 and the second soft zone 25 is reinforced by the front bead 68.

The rear bead 69 is formed in the bottom part 33 of the lower member 22 at the center in the vehicle widthwise direction between the second soft zone 25 and the third soft zone 26 (between the adjacent soft zones). Specifically, like the front bead 68, the rear bead 69 is formed to bulge from the bottom part 33 toward the inside 74 of the left rear frame 13 and extends in the longitudinal direction with respect to the vehicle body.

Thus, an area of the bottom part 33 between the second soft zone 25 and the third soft zone 26 is reinforced by the rear bead 69.

To put it another way, the ultra-high-strength part 31 in an area between the first soft zone 24 and the second soft zone 25 is reinforced by the front bead 68, whereas the ultra-high-strength part 31 in an area between the second soft zone 25 and the third soft zone 26 is reinforced by the rear bead 69. Accordingly, it is possible to prevent the bending of the ultra-high-strength part 31 in the area between the first soft zone 24 and the second soft zone 25 and the ultra-high-strength part 31 in the area between the second soft zone 25 and the third soft zone 26 when the impact load F1 is input from behind the vehicle body to the bumper beam 15.

Thereby, it is possible to bend the left rear frame 13 reliably at the first soft zone 24, the second soft zone 25, and the third soft zone 26.

As illustrated in FIGS. 7 and 9, the inner bottom concave part 71 is formed in the inner lower contour 41 at the first soft zone 24 so as to be concaved toward the inside 74 of the left rear frame 13.

The outer bottom concave part 72 is a portion symmetric to the inner bottom concave part 71. In other words, the outer bottom concave part 72 is formed in the outer lower contour 42 at the first soft zone 24 so as to be concaved toward the inside 74 of the left rear frame 13.

Accordingly, it is possible to concentrate stresses on the inner bottom concave part 71 and the outer bottom concave part 72 when the impact load F1 is input from behind the vehicle body to the bumper beam 15 and thus to induce the bending of the inner lower contour 41 and the outer lower contour 42 at the bottom concave parts 71, 72.

Thereby, it is possible to bend the first soft zone 24 stably at the inner bottom concave part 71 and the outer bottom concave part 72.

As illustrated in FIGS. 1 and 10, the left connection part 14 is provided on the rear end part 13a of the left rear frame 13, and the right connection part 14 is provided on the rear end part 13a of the right rear frame 13. The bumper beam 15 is provided on the left connection part 14 and the right connection part 14. In other words, the bumper beam 15 spans the rear end part 13a of the left rear frame 13 and the rear end part 13a of the right rear frame 13 via the left and right connection parts 14.

In this state, the bumper beam 15 is formed in a substantially curve shape so as to extend in the vehicle widthwise direction and bulge toward the rear of the vehicle body. Specifically, the bumper beam 15 has: a beam front wall 81; a beam rear wall 82; a beam upper part 83, a beam lower part 84, and a beam partition part 85.

While the beam front wall 81 is placed facing the front of the vehicle body, its left end part 81a is attached to the rear wall 14a of the left connection part 14 and its right end part 81b is attached to the rear wall 14a of the right connection part 14.

The beam front wall 81 has: an upper front wall 81a that defines an upper part with respect to the beam partition part 85; and a lower front wall 81b that defines a lower part with respect to the beam partition part 85. The upper front wall 81a has a thickness dimension T3 of 3.5 mm, whereas the lower front wall 81b has a thickness dimension T4 of 3.0 mm.

The beam rear wall 82 is provided behind the beam front wall 81 with respect to the vehicle body with a clearance between them. The beam rear wall 82 has: an upper rear wall 82a that defines the upper part of the beam partition part 85; and a lower rear wall 82b that defines the lower part of the beam partition part 85. The upper rear wall 82a has a thickness dimension T5 of 3.5 mm, whereas the lower rear wall 82b has a thickness dimension T6 of 2.0 mm.

The beam upper part 83 is provided on an upper edge of the beam front wall 81 and an upper edge of the beam rear wall 82. The beam upper part 83 has a thickness dimension T7 of 4.0 mm.

The beam lower part 84 is provided on a lower edge of the beam front wall 81 and a lower edge of the beam rear wall 82. The beam lower part 84 has: a front lower part 84a that juts out toward the rear of the vehicle body from the lower edge of the beam front wall 81; and a rear lower part 84b that juts out from the rear end of the front lower part 84a to the lower end of the beam rear wall 82.

The front lower part 84a is formed substantially horizontally, whereas the rear lower part 84b is formed in a slope shape. Thereby, the beam lower part 84 has a substantially V-shaped form. The beam lower part 84 has a thickness dimension T8 of 2.0 mm.

The beam partition part 85 is disposed between the beam upper part 83 and the beam lower part 84, and is provided at the center between the beam front wall 81 and the beam rear wall 82. The beam partition part 85 has a thickness dimension T9 of 3.0 mm.

With the beam front wall 81, the beam rear wall 82, the beam upper part 83, the beam lower part 84, and the beam partition part 85, the bumper beam 15 is formed to have a cross section substantially in the shape of the letter "8".

Meanwhile, the upper front wall 81a of the beam front wall 81, the upper rear wall 82a of the beam rear wall 82, the beam upper part 83, and the beam partition part 85 together form an upper beam part 87.

In the upper beam part 87, the upper front wall 81a has the thickness dimension T3 of 3.5 mm, the upper rear wall 82a has the thickness dimension T5 of 3.5 mm, the beam upper part 83 has the thickness dimension T7 of 4.0 mm, and the beam partition part 85 has the thickness dimension T9 of 3.0 mm.

Further, the lower front wall 81b of the beam front wall 81, the lower rear wall 82b of the beam rear wall 82, and the beam lower part 84 together form a lower beam part 88.

In the lower beam part 88, the lower front wall 81b has the thickness dimension T4 of 3.0 mm, the lower rear wall 82b has the thickness dimension T6 of 2.0 mm, and the beam lower part 84 has the thickness dimension T8 of 2.0 mm.

Since the thickness dimension of each of the lower rear wall 82b and the beam lower part 84 is kept at 2.0 mm in this manner, the lower beam part 88 is formed to have a thickness dimension smaller than the upper beam part 87.

The reason why the thickness dimension of the lower beam part 88 is kept smaller than the upper beam part 87 is as follows. Specifically, the bumper beam 15 is used for SUVs with a high vehicle height. Because such an SUV has a high vehicle height, the bumper beam 15 is placed at a higher position than it is in normal automobiles. For this reason, when a normal automobile collides with this SW from behind the vehicle body (such a collision is hereinafter referred to as a "high-speed collision") while the SUV is running, a relatively large impact load F4 is input to the lower beam part (that is, the lower half part) 88 of the bumper beam 15.

Against this background, the thickness dimension of the lower beam part 88 of the bumper beam 15 is set smaller than that of the upper beam part 87 of the bumper beam. Hence, when the impact load F4 is input to the lower beam part 88 due to the high-speed collision, it is possible to absorb the impact load F4 favorably by the crush of the lower beam part 88.

Thereby, it is possible to use the lower beam part 88 to adjust a load to be transmitted from the lower beam part 88 to the left rear frame 13, and thus to adjust (control) the deformation mode of the left rear frame 13.

Besides, the bumper beam 15 is covered with the bumper 16 from behind the vehicle. Accordingly, when the bumper collides with a wall part or the like during parking of the SUV in a garage in back low-speed driving (such a collision is hereinafter referred to as a "low-speed collision"), for example, a relatively minute impact load F5 is input to the entire face of the bumper beam 15 through the bumper 16.

Against this background, the thickness dimension of the upper beam part 87 of the bumper beam 15 is set larger than that of the lower beam part 88 of the bumper beam. Thereby, it is possible to use the bumper beam 15 to support the impact load F5 having been input to the entire face of the bumper beam 15 due to the low-speed collision, and thus to prevent deformation of a body frame member such as the left rear frame 13.

In this way, the thickness dimension of the lower beam part 88 of the bumper beam 15 is set smaller than that of the upper beam part 87 of the bumper beam in order for the lower beam part 88 and the upper beam part 87 to have different rigidity.

This enables the bumper beam 15 to be ready for both high-speed and low-speed collisions of the SUV, that is to say, enables the bumper beam 15 to have both high-speed collision performance and light-collision performance.

Next, based on FIGS. 11 to 14, a description is given of an example where the vehicle rear body structure 10 absorbs an impact load F6 due to a high-speed collision generated when a normal automobile collides with the bumper 16 at high speed from behind the SUV during running.

Figure 11A:
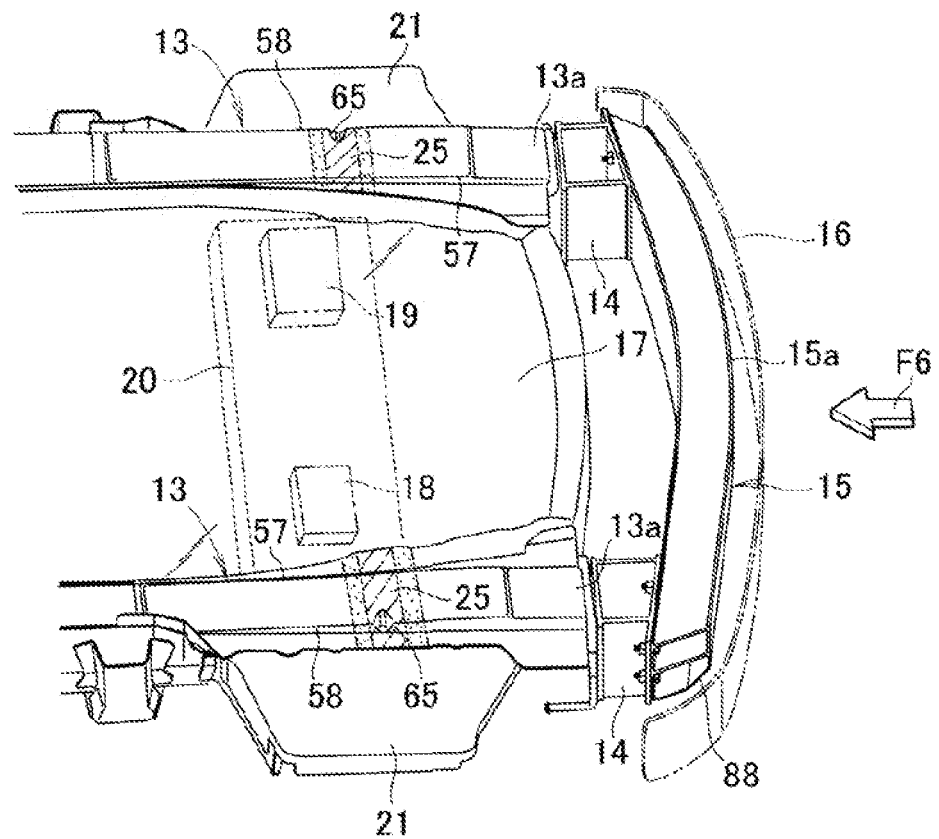
FIGS. 11(a) and 11(b) are views explaining an example where an impact load due to a high-speed collision is input to the vehicle rear body structure of Embodiment 1.

As illustrated in FIG. 11(a), the relatively large impact load F6 is input to the center 15a of the bumper 16 in the vehicle widthwise direction from behind the vehicle body due to a high-speed collision. The bumper 16 is crushed by the impact load F6, and the impact load F6 is input to the bumper beam 15 (to be more precise, the lower beam part 88).

Figure 11B:
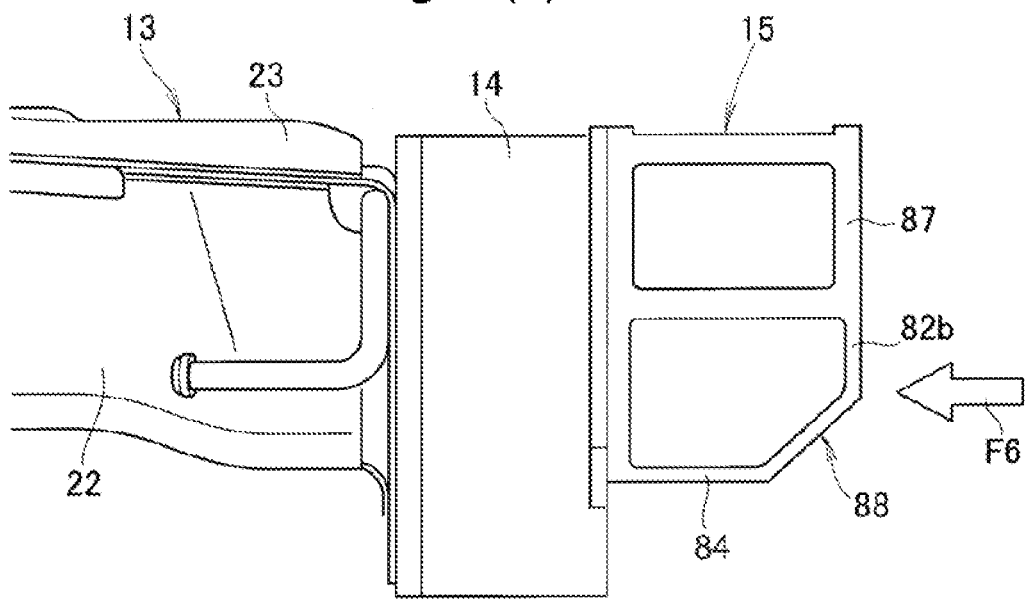

As illustrated in FIG. 11(b), the thickness dimension T6 of the lower rear wall 82b of the lower beam part 88 and the thickness dimension T8 of the beam lower part 84 is kept small (2.0 mm). The impact load F6 is input to this lower rear wall 82b from behind the vehicle body.

Figure 12A:
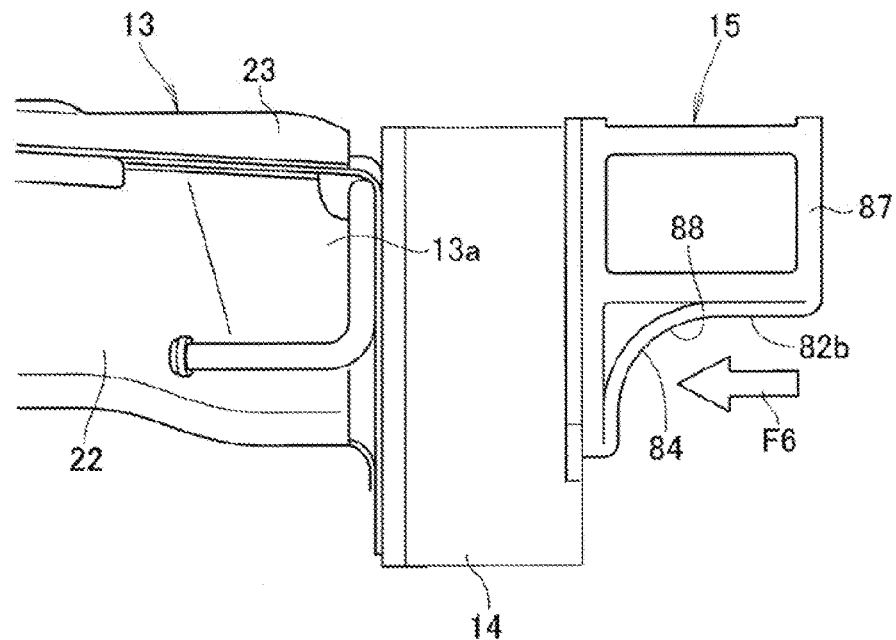
FIGS. 12(a) and 12(b) are views explaining an example where a lower beam part of a bumper beam of Embodiment 1 is deformed by an impact load.

As illustrated in FIG. 12(a), due to the input of the impact load F6 to the lower rear wall 82b of the lower beam part 88 and the beam lower part 84, the lower rear wall 82b and the beam lower part 84 are deformed by the impact load F6.

By the deformation of the lower rear wall 82b and the beam lower part 84, the impact load F6 is partially absorbed at the lower beam part 88. The impact load F6 having been partially absorbed is input to the rear end part 13a of the left rear frame 13 via the lower beam part 88 and the left connection part 14.

Figure 12B:
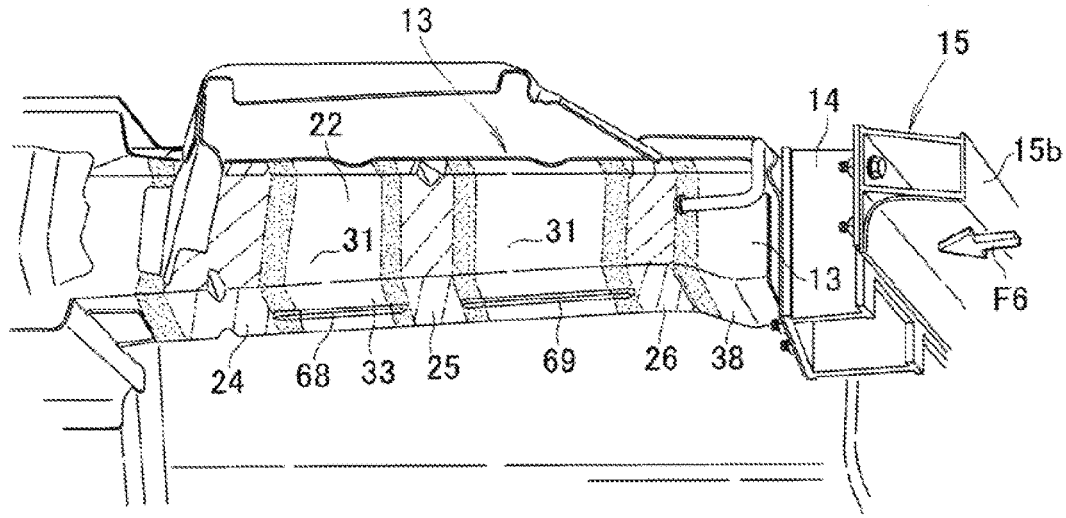

As illustrated in FIG. 12(b), the first soft zone 24 and the third soft zone 26 are formed only in the lower member 22. Accordingly, the rigidity of the first soft zone 24 and the third soft zone 26 in the lower half part (that is, the lower member 22) of the left rear frame 13 is kept low.

In addition, the second soft zone 25 is formed in a ring shape throughout the circumference of the left rear frame 13.

Figure 13A:
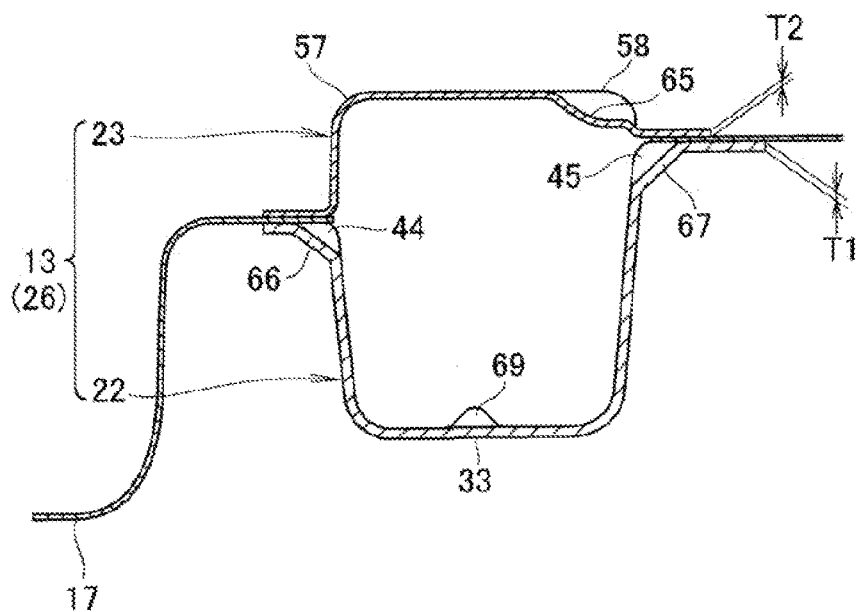
FIGS. 13(a) and 13(b) are views explaining an example where the left rear frame of Embodiment 1 is deformed in a vertical direction.

As illustrated in FIG. 13(a), the lower member 22 is formed to have the thickness dimension T1 larger than the thickness dimension T2 of the upper member 23. Accordingly, because the second soft zone 25 is formed in a ring shape, the rigidity of the lower member 22 at the second soft zone 25 is kept low, and the rigidity of the upper member 23 is kept lower than the lower member 22.

Figure 13B:
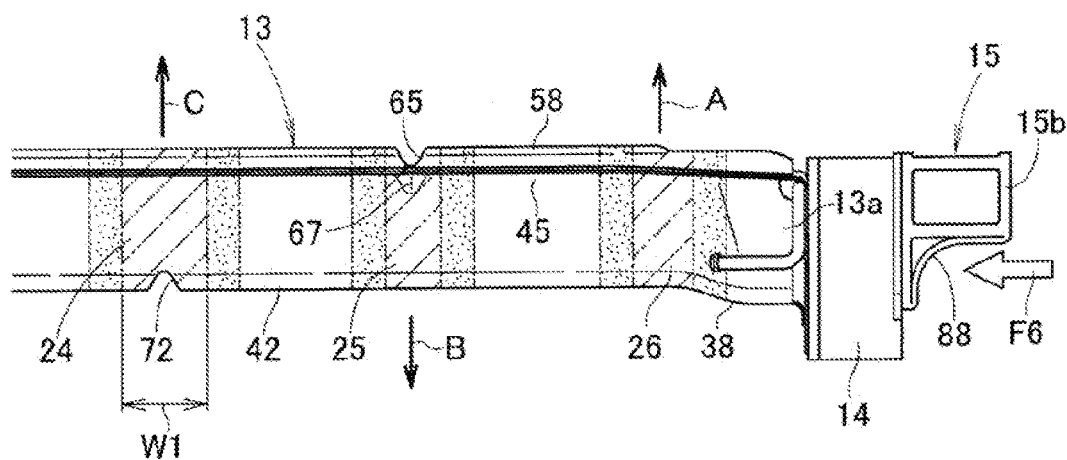

As illustrated in FIG. 13(b), by the impact load F6 having been input to the rear end part 13a of the left rear frame 13, the third soft zone 26 is bent into a mountain fold as illustrated by the arrow A. Subsequently, the second soft zone 25 is bent into a valley fold as illustrated by the arrow B. Next, the first soft zone 24 is bent into a mountain fold as illustrated by the arrow C.

Figure 14:
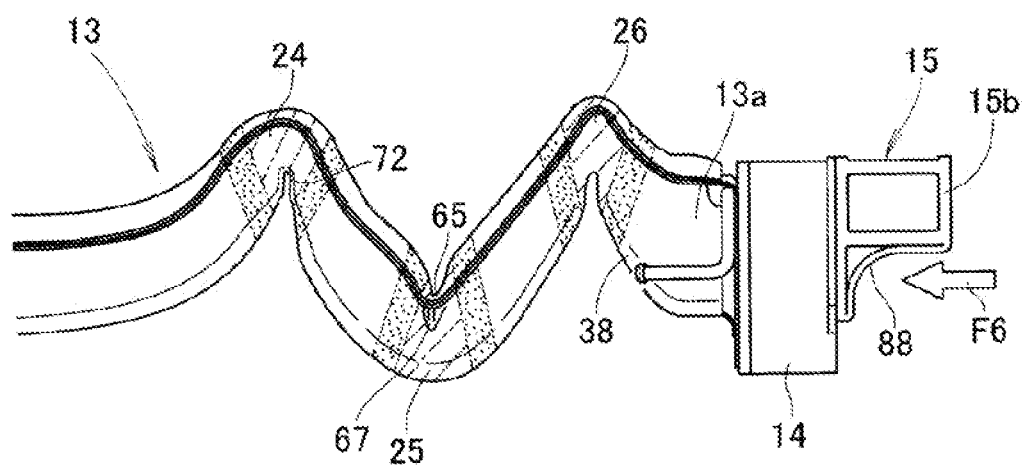
FIG. 14 is a view explaining an example of deforming the left rear frame of Embodiment 1 in the vertical direction to absorb an impact load.

As illustrated in FIG. 14, the left rear frame 13 is deformed so that it is bent in the vertical direction at the first soft zone 24, the second soft zone 25, and the third soft zone 26. By the vertical deformation of the left rear frame 13, the left rear frame 13 can excellently absorb the impact load F6 having been input to the rear end part 13a of the left rear frame 13.

Here, as illustrated in FIG. 11(a), the gasoline tank 20, the IPU 18, the high-voltage battery 19, and the like are arranged between the left rear frame 13 and the right rear frame 13.

Thus, by deforming the left rear frame 13 so as to bend them in the vertical direction, it is possible to inhibit the left rear frame 13 from coming into contact with the gasoline tank 20, the IPU 18, the high-voltage battery 19, and the like, and thereby to protect the gasoline tank 20, the IPU 18, the high-voltage battery 19, and the like.

In addition, by inhibiting the contact of the left rear frame 13 with the gasoline tank 20, the IPU 18, the high-voltage battery 19, and the like, it is possible to reserve a certain amount of deformation of the left rear frame 13.

This enables the left rear frame 13 to excellently absorb the impact load F6 (see FIG. 14) having been input thereto from behind the vehicle body by the deformation of the left rear frame 13.

Here, as illustrated in FIG. 13(b), the bottom tilt part 38 is formed near the rear end part 13a of the left rear frame 13. In other words, the left rear frame 13 is formed so that the sectional area of its closed section becomes continuously smaller from the rear end part 13a of the left rear frame 13 to the third soft zone 26.

Accordingly, stresses are concentrated on the third soft zone 26 upon input of the impact load F6 to the rear end part 13a of the left rear frame 13. Thereby, it is possible to induce the bending of the third soft zone 26 and thus to bend the left rear frame 13 into a mountain fold at the third soft zone 26 stably as illustrated by the arrow A.

Moreover, as illustrated in FIGS. 13(a) and 13(b), the upper concave part 65 is provided in the outer upper contour 58 at the second soft zone 25. Accordingly, it is possible to concentrate stresses on the upper concave part 65 upon input of the impact load F6 to the rear end part 13a of the left rear frame 13, and thus to induce the bending of the bending of the outer upper contour 58 at the upper concave part 65.

Thereby, as described previously, it is possible to bend the outer upper contour 58 at the second soft zone 25 favorably in the same way as the inner upper contour 57, and thus to bend the second soft zone 25 stably.

In addition, the inner flange convex part 66 is provided in the lower inner flange contour 44 at the second soft zone 25. Further, the outer flange convex part 67 is provided in the lower outer flange contour 45 at the second soft zone 25. This makes it possible to concentrate stresses on the inner flange convex part 66 and the outer flange convex part 67 upon input of the impact load F6 to the rear end part 13a of the left rear frame 13.

Thereby, it is possible to induce the bending of the lower inner flange contour 44 and the lower outer flange contour 45 at the flange convex parts 66, 67, and thus to bend the second soft zone 25 stably at the inner flange convex part 66 and the outer flange convex part 67.

In this way, the upper concave part 65, the inner flange convex part 66, and the outer flange convex part 67 are arranged in the second soft zone 25. Thereby, it is possible to bend the left rear frame 13 into a valley fold at the second soft zone 25 stably as illustrated by the arrow B.

In addition, the first soft zone 24 is formed to have the width dimension W1 larger than those of the second soft zone 25 and the third soft zone 26. Accordingly, a large margin for bending of the first soft zone 24 is reserved.

This enables the first soft zone 24 to be bent stably after the third soft zone 26 and the second soft zone 25 are bent.

Besides, the inner bottom concave part 71 (see FIG. 7) is provided in the inner lower contour 41 at the first soft zone 24. Moreover, the outer bottom concave part 72 is provided in the outer lower contour 42 at the first soft zone 24. Accordingly, it is possible to concentrate stresses on the inner bottom concave part 71 and the outer bottom concave part 72 upon input of the impact load F6 to the rear end part 13a of the left rear frame 13.

Thereby, it is possible to induce the bending of the inner lower contour 41 and the outer lower contour 42 at the bottom concave parts 71, 72 and thus to bend the first soft zone 24 stably at the inner bottom concave part 71 and the outer bottom concave part 72.

In this way, the first soft zone 24 is formed to have the large width dimension W1, and the inner bottom concave part 71 and the outer bottom concave part 72 are arranged in the first soft zone 24. Thereby, it is possible to bend the left rear frame 13 into a mountain fold at the first soft zone 24 stably as illustrated by the arrow C.

In addition, as illustrated in FIG. 12(b), the front bead 68 and the rear bead 69 are arranged in the bottom part 33 of the lower member 22. Accordingly, the ultra-high-strength part 31 in the area between the first soft zone 24 and the second soft zone 25 is reinforced by the front bead 68, and the ultra-high-strength part 31 in the area between the second soft zone 25 and the third soft zone 26 is reinforced by the rear bead 69.

Thereby, it is possible to bend the left rear frame 13 stably at the first soft zone 24, the second soft zone 25, and the third soft zone 26.

In this way, the left rear frame 13 is provided with the bottom tilt part 38, the upper concave part 65, the inner flange convex part 66, and the outer flange convex part 67, and is further provided with the inner bottom concave part 71, the outer bottom concave part 72, the front bead 68, and the rear bead 69. In addition, the first soft zone 24 is formed to have the large width dimension W1.

Thereby, as illustrated in FIG. 14, it is possible to bend and deform the first soft zone 24, the second soft zone 25, and the third soft zone 26 reliably.

By deforming the left rear frame 13 in the vertical direction reliably in this manner, it is possible to further excellently absorb the impact load F6 having been input to the rear end part 13a of the left rear frame 13 from behind the vehicle body.

Next, based on FIG. 15, a description is given of an example where the upper beam part 87 of the bumper beam 15 supports an impact load F7 due to a low-speed collision generated when the bumper 16 collides with a wall part 91 during parking of the SUV in a garage.

As illustrated in FIG. 15 (a), the bumper beam 15 is covered with the bumper 16 from behind the vehicle. Accordingly, when the bumper 16 collides at low speed with the wall part 91 or the like at low speed during parking of the SUV in the garage in back low-speed driving, a relatively minute impact load F7 is input to the bumper 16.

The entire bumper 16 is crushed by the impact load F7, and the impact load F7 is input to the entire face of the bumper beam 15 (particularly the upper beam part 87) through the bumper 16.

As illustrated in FIG. 15(b), the thickness dimension of the upper beam part 87 of the bumper beam 15 is larger than that of the lower beam part 88 of the bumper beam. This enables the upper beam part 87 to support the impact load F7 having been input to the entire face of the bumper beam 15 due to the low-speed collision.

Thereby, it is possible to prevent deformation of a body frame member such as the left rear frame 13.

Figure 16A:
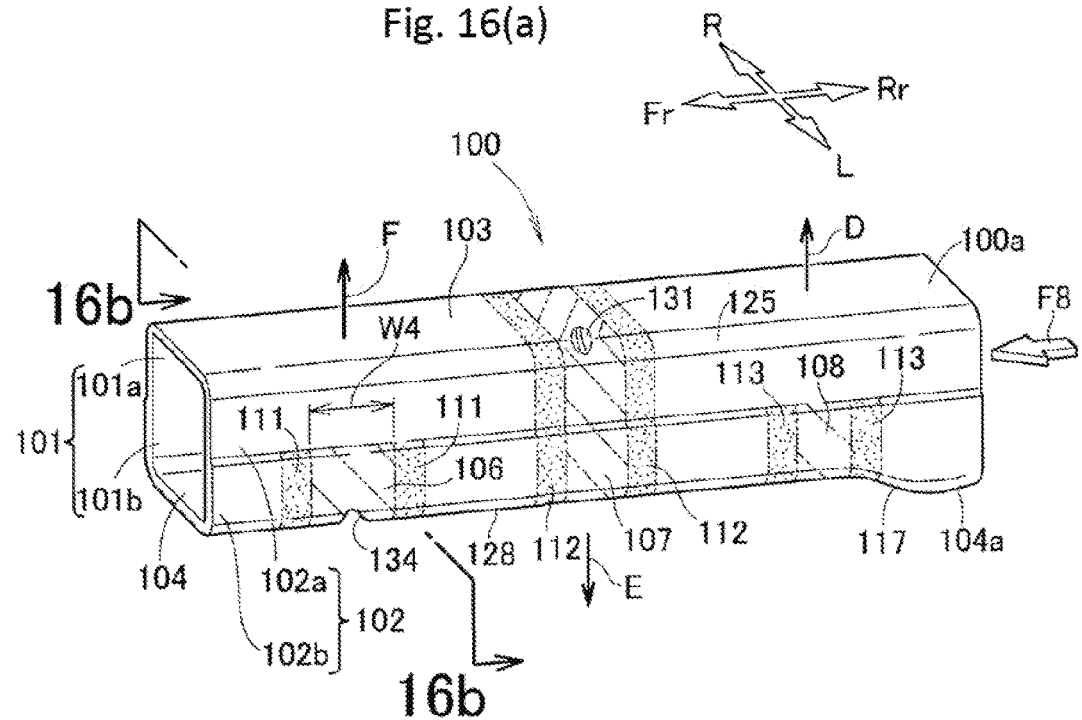
FIG. 16(a) is a perspective view illustrating a left rear frame of Embodiment 2 according to the present invention.
Figure 16B:
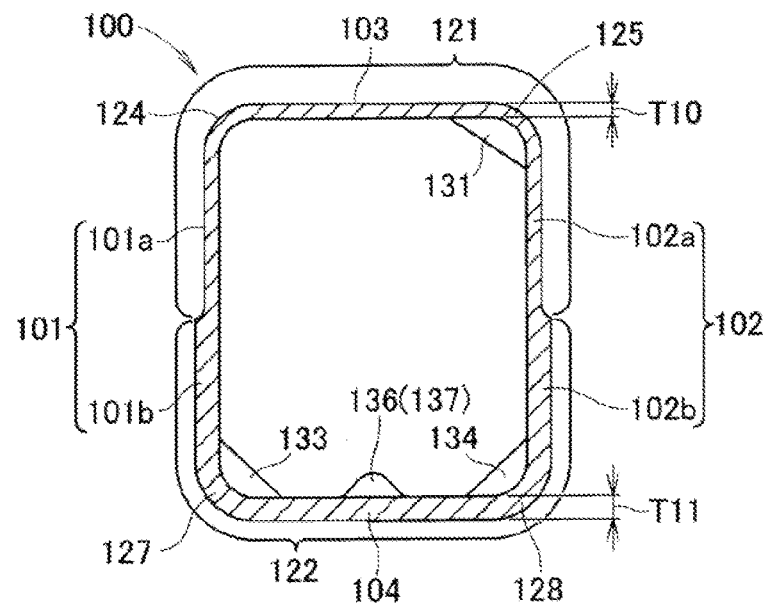
FIG. 16(b) is a sectional view taken along the line 16b-16b in FIG. 16(a).
Figure 17:
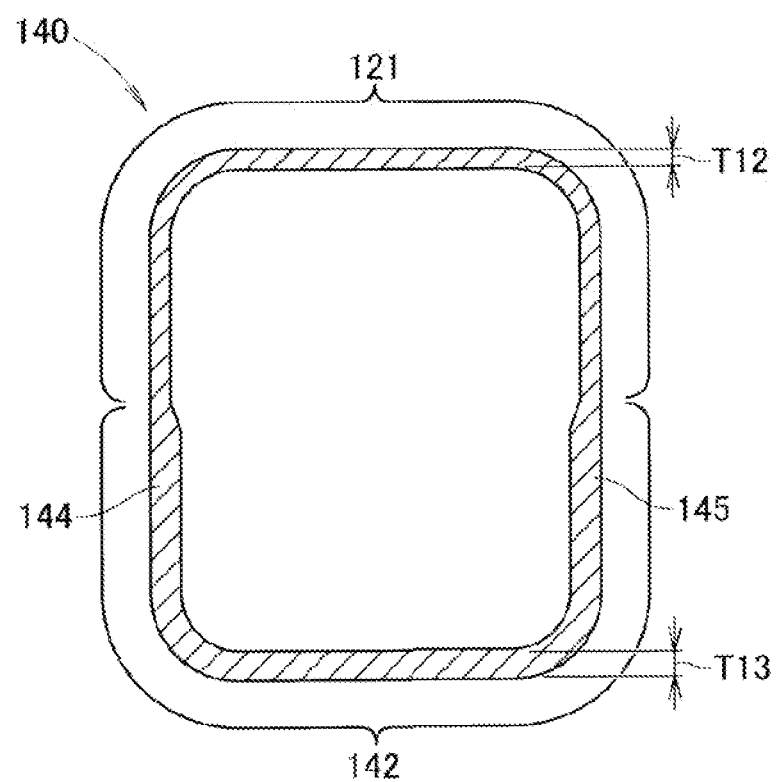
FIG. 17 is a sectional view illustrating a left rear frame of Embodiment 3 according to the present invention.

Next, a left rear frame 100 according to Embodiments 2 and 3 is described based on FIGS. 16 and 17. Note that, in the left rear frame 100 according to Embodiments 2 and 3, the same or similar members as those of the left rear frame 13 according to Embodiment 1 are given the same reference numeral as Embodiment 1 and not described in detail.

Embodiment 2

The left rear frame 100 according to Embodiment 2 is described.

As illustrated in FIGS. 16(a) and 16(b), the left rear frame 100 is one obtained by changing the left rear frame 13 according to Embodiment 1 into an integral member, and its configuration other than this is substantially the same as that of the left rear frame 13 according to Embodiment 1.

The left rear frame 100 includes: an inner wall 101 that is disposed on the inner side in the vehicle widthwise direction; an outer wall 102 that is disposed on the outer side in the vehicle widthwise direction; a top part 103 that is provided on the upper edges of the respective inner wall 101 and outer wall 102; and a bottom part 104 that is provided on the bottom edges of the respective inner wall 101 and outer wall 102.

With the inner wall 101, the outer wall 102, the top part 103, and the bottom part 104, the left rear frame 100 is formed to have a substantially rectangular closed section.

The left rear frame 100 is formed by hot-stamp molding as in the case of the lower member 22 and the upper member 23 according to Embodiment 1.

As in Embodiment 1, a first soft zone 106, a second soft zone 107, and a third soft zone 108 are formed in the left rear frame 100 sequentially from the front of the vehicle body to the rear of the vehicle body so as to be spaced from one another.

Further, first soft transition zones 111 are respectively arranged adjacent to the front and rear sides of the first soft zone 106. Second soft transition zones 112 are respectively arranged adjacent to the front and rear sides of the second soft zone 107. Third soft transition zones 113 are respectively arranged adjacent to the front and rear sides of the third soft zone 108.

Here, portions of the left rear frame 100 other than the first to third soft zones 106 to 108 and the first to third soft transition zones 111 to 113 are ultra-high-strength parts (other portions of the rear frame) 115 having a tensile strength over 1400 Mpa.

Each of the first soft zone 106, the second soft zone 107, and the third soft zone 108 is a high-strength part whose tensile strength is kept within a range of 500 to 1000 Mpa that is lower than the ultra-high-strength part 115.

Each of the first soft transition zones 111, the second soft transition zones 112, and the third soft transition zones 113 is a strength transition part whose strength transitions gently between the tensile strength (1400 Mpa) and the tensile strength (500 to 1000 Mpa).

The inner wall 101 has: an upper inner wall 101a that defines an upper half part of the inner wall 101 and has a thickness dimension T10; and a lower inner wall 101b that defines a lower half part of the inner wall 101 and has a thickness dimension T11.

The outer wall 102 has: an upper outer wall 102a that defines an upper half part of the outer wall 102 and has the thickness dimension T10; and a lower outer wall 102b that defines a lower half part of the outer wall 102 and has the thickness dimension T11.

The top part 103 is formed to have the thickness dimension T10 in the same way as the upper inner wall 101a and the upper outer wall 102a.

The bottom part 104 is formed to have the thickness dimension T11 in the same way as the lower inner wall 101b and the lower outer wall 102b. As in Embodiment 1, the bottom part 104 has a bottom tilt part 117 near a rear end part 104a of the bottom part 104. The bottom tilt part 117 is formed to incline upward from the rear end part 104a of the bottom part 104 to the third soft zone 108.

Thereby, the left rear frame 100 is formed so that the sectional area of its closed section becomes continuously smaller from a rear end part 100a of the left rear frame 100 to the third soft zone 108.

With the upper inner wall 101a, the upper outer wall 102a, and the top part 103, an upper half part 121 of the left rear frame 100 is formed to have a substantially U-shaped cross section. With the lower inner wall 101b, the lower outer wall 102b, and the bottom part 104, a lower half part 122 of the left rear frame 100 is formed to have a substantially U-shaped cross section.

The lower half part 122 bulges to the outer side of the left rear frame 100 with respect to the front face of the upper half part 121. In other words, the thickness dimension T11 of the lower half part 122 is larger than the thickness dimension T10 of the upper half part 121.

The first soft zone 106 and the first soft transition zones 111 are formed at a position close to a front end part of the lower half part 122 so as to have a substantially U-shaped cross section. The first soft zone 106 is formed to have a width dimension W4 in the vehicle widthwise direction larger than the width dimensions of the second soft zone 107 and the third soft zone 108.

Moreover, the third soft zone 108 and the third soft transition zones 113 are formed at a position close to a rear end part of the lower half part 122 so as to have a substantially U-shaped cross section.

Further, the second soft zone 107 and the second soft transition zones 112 are formed in a ring shape throughout the circumference of the left rear frame 100 and at the center of the left rear frame 100 (that is, the lower half part 122 and the upper half part 121).

In addition, the crossing between the inner wall 101 and the top part 103 forms an inner upper contour 124 extending in the longitudinal direction with respect to the vehicle body. Likewise, the crossing between the outer wall 102 and the top part 103 forms an outer upper contour 125 extending in the longitudinal direction with respect to the vehicle body.

Further, the crossing between the inner wall 101 and the bottom part 104 forms an inner lower contour 127 extending in the longitudinal direction with respect to the vehicle body. Likewise, the crossing between the outer wall 102 and the bottom part 104 forms an outer lower contour 128 extending in the longitudinal direction with respect to the vehicle body.

An upper concave part 131 is formed in the outer upper contour 125 at the second soft zone 107. The upper concave part 131 is a portion having the same role as the upper concave part 65 in Embodiment 1.

Besides, an inner bottom concave part 133 is formed in the inner lower contour 127 at the first soft zone 106. Likewise, an outer bottom concave part 134 is formed in the outer lower contour 128 at the first soft zone 106. The inner bottom concave part 133 and the outer bottom concave part 134 are portions having the same roles as the inner bottom concave part 71 and the outer bottom concave part 72 in Embodiment 1, respectively.

Further, a front bead 136 and a rear bead 137 are formed in the bottom part 104 of the left rear frame 100. The front bead 136 and the rear bead 137 are portions having the same roles as the front bead 68 and the rear bead 69 in Embodiment 1, respectively.

The left rear frame 100 according to Embodiment 2 can achieve the same effect as the left rear frame 13 according to Embodiment 1. Specifically, when an impact load F8 is input to the rear end part 100a of the left rear frame 100, the third soft zone 108 is bent into a mountain fold by the input impact load F8 as illustrated by the arrow D. Next, the second soft zone 107 is bent into a valley fold as illustrated by the arrow E. Subsequently, the first soft zone 106 is bent into a mountain fold as illustrated by the arrow F.

By deforming the left rear frame 100 in the vertical direction in this manner, the left rear frame 100 can excellently absorb the impact load F8 having been input to the rear end part 100a of the left rear frame 100.

Further, by deforming the left rear frame 100 in the vertical direction, it is possible to inhibit the left rear frame 100 from coming into contact with the gasoline tank 20, the IPU 18, the high-voltage battery 19 (see FIG. 1), and the like, and thereby to protect the gasoline tank 20, the IPU 18, the high-voltage battery 19, and the like.

In addition, the bottom tilt part 117, the upper concave part 131, the inner bottom concave part 133, the outer bottom concave part 134, the front bead 136, and the rear bead 137 are arranged in the left rear frame 100. Moreover, the first soft zone 106 is formed to have the large width dimension W4.

Thereby, it is possible to bend and deform the left rear frame 100 in the vertical direction reliably as in Embodiment 1.

Further, according to the left rear frame 100 of Embodiment 2, since the left rear frame 100 is formed as an integral unit, it is possible to reduce the number of components and reduce the number of man-hours needed to assemble the left rear frame 100.

A left rear frame 140 according to Embodiment 3 is described.

As illustrated in FIG. 17, the left rear frame 140 is one obtained by causing the left rear frame 100 (to be more precise, the lower half part 122) of Embodiment 2 to bulge inward, and its configuration other than this is substantially the same as that of the left rear frame 100 according to Embodiment 2.

In the left rear frame 140, a lower half part 142 bulges to the inner side of the left rear frame 140 with respect to the inner face of the upper half part 121. Accordingly, a thickness dimension T13 of the lower half part 142 is larger than a thickness dimension T12 of the upper half part 121.

The left rear frame 140 according to Embodiment 3 can achieve the same effect as the left rear frame 100 according to Embodiment 2.

In addition, by causing the lower half part 142 to bulge to the inner side of the left rear frame 140 from the inner face of the upper half part 121, an inner wall 144 and an outer wall 145 of the left rear frame 140 can each have a flat surface. Thereby, the appearance of the left rear frame 140 can be improved.

Note that the vehicle rear body structure according to the present invention is not limited to the foregoing embodiments, and can be changed, improved, etc. as appropriate.

For example, in Embodiments 1 to 3 above, the description has been given of the example where the vehicle rear body structure 10 is applied to SUVs; however, the vehicle rear body structure 10 is not limited thereto, and is applicable to normal automobiles.

Further, the shapes and configurations of the vehicle rear body structure, the left and right rear frames, the bumper beam, the lower member, the upper member, the first to third soft zones, the ultra-high-strength part, the bottom tilt part, the inner lower contour, the outer lower contour, the lower inner flange contour, the lower outer flange contour, the inner upper contour, the outer upper contour, the upper concave part, the inner flange convex part, the outer flange convex part, the front and rear beads, the inner bottom concave part, the outer bottom concave part, the upper half part, the lower half part, and the like illustrated in Embodiments 1 to 3 above are not limited to the exemplified ones and can be changed as appropriate.

INDUSTRIAL APPLICABILITY

The present invention is suitable for use in automobiles including a vehicle rear body structure in which a bumper beam spans rear end parts of left and right rear frames so as to extend in the vehicle widthwise direction.

DESCRIPTION OF REFERENCE NUMERALS

10 VEHICLE REAR BODY STRUCTURE
13, 100, 140 LEFT AND RIGHT REAR FRAMES (REAR FRAME)
13a REAR END PART OF LEFT REAR FRAME (REAR END PART OF REAR FRAME)
15 BUMPER BEAM
22 LOWER MEMBER
23 UPPER MEMBER
24, 106 FIRST SOFT ZONE
25, 107 SECOND SOFT ZONE
26, 108 THIRD SOFT ZONE
31, 115 ULTRA-HIGH-STRENGTH PART (OTHER PORTIONS OF REAR FRAME)
33, 104 BOTTOM PART
34 LOWER INNER WALL
35 LOWER OUTER WALL
36 LOWER INNER FLANGE
37 LOWER OUTER FLANGE
38, 117 BOTTOM TILT PART
41, 127 INNER LOWER CONTOUR
42, 128 OUTER LOWER CONTOUR
44 LOWER INNER FLANGE CONTOUR (INNER FLANGE CONTOUR)
45 LOWER OUTER FLANGE CONTOUR (OUTER FLANGE CONTOUR)
51 TOP PART
52 UPPER INNER WALL
53 UPPER OUTER WALL
54 UPPER INNER FLANGE
55 UPPER OUTER FLANGE
57, 124 INNER UPPER CONTOUR
58, 125 OUTER UPPER CONTOUR
65, 131 UPPER CONCAVE PART
66 INNER FLANGE CONVEX PART (FLANGE CONVEX PART)
67 OUTER FLANGE CONVEX PART (FLANGE CONVEX PART)
68, 136 FRONT BEAD (BEAD)
69, 137 REAR BEAD (BEAD)
71, 133 INNER BOTTOM CONCAVE PART (BOTTOM CONCAVE PART)
72, 134 OUTER BOTTOM CONCAVE PART (BOTTOM CONCAVE PART)
74 INSIDE OF LEFT REAR FRAME
81 BEAM FRONT WALL
81a UPPER FRONT WALL OF BEAM FRONT WALL
81b LOWER FRONT WALL OF BEAM FRONT WALL
82 BEAM REAR WALL
82a UPPER REAR WALL OF BEAM REAR WALL
82b LOWER REAR WALL OF BEAM REAR WALL
83 BEAM UPPER PART
84 BEAM LOWER PART
85 BEAM PARTITION PART
87 UPPER BEAM PART
88 LOWER BEAM PART
121 UPPER HALF PART
122, 142 LOWER HALF PART
T1 THICKNESS DIMENSION OF LOWER MEMBER
T2 THICKNESS DIMENSION OF UPPER MEMBER
T10, T12 THICKNESS DIMENSION OF UPPER HALF PART
T11, T13 THICKNESS DIMENSION OF LOWER HALF PART
W1, W4 WIDTH DIMENSION OF FIRST SOFT ZONE
W2 WIDTH DIMENSION OF SECOND SOFT ZONE
W3 WIDTH DIMENSION OF THIRD SOFT ZONE

The invention claimed is:
1. A vehicle rear body structure comprising:
rear frames that extend in a vehicle front-rear direction and are arranged on respective left and right sides at a vehicle body rear part, each of the rear frames being composed of an upper half part and a lower half part which are attached to each other so as to form a closed area in a cross-sectional direction thereof; and a bumper beam that extends in a vehicle widthwise direction between the rear frames and bridges rear ends thereof, wherein each rear frame has a first soft zone, a second soft zone, and a third soft zone that are arranged in respective different positions spaced from one another in the vehicle front-rear direction and in that order from a vehicle front side to a vehicle rear side, each of the first soft zone, the second soft zone and the third soft zone having lower strength than other portions of said rear frame, said second soft zone is disposed between said first soft zone and said third soft zone, said second soft zone is disposed on said upper and lower half parts of said rear frame in a manner that forms a ring shape extending along a circumference of said rear frame in the cross-sectional direction, and said first soft zone and said third soft zone are disposed on said lower half part of said rear frame and not disposed on said upper half part of said rear frame.

2. The vehicle rear body structure according to claim 1, wherein said rear frame has said lower half part formed of a lower elongated member and said upper half part formed of an upper elongated member, said lower elongated member and said upper elongated member being coupled together.

3. The vehicle rear body structure according to claim 1, wherein each of said rear frames is shaped such that said closed area in the cross-sectional direction becomes smaller continuously from said rear end to said third soft zone of said rear frame.

4. The vehicle rear body structure according to claim 1, wherein said first, second and third soft zones have respective width dimensions in the vehicle front-rear direction, the width dimension of the first soft zone being larger than each width dimension of said second soft zone and said third soft zone.

5. The vehicle rear body structure according to claim 2, wherein said upper elongated member comprises:

a top part that extends in the vehicle front-rear direction and has an inner edge and an outer edge with respect to the vehicle widthwise direction;

an upper inner wall that extends downward from the inner edge of said top part, thereby forming an upper inner contour extending between said top part and said upper inner wall in the vehicle front-rear direction;

an upper outer wall that extends downward from the outer edge of said top part, thereby forming an upper outer contour extending between said top part and said upper outer wall in the vehicle front-rear direction;

an upper inner flange that juts out inward in the vehicle widthwise direction from a lower edge of said upper inner wall; and an upper outer flange that juts out outward in the vehicle widthwise direction from a lower edge of said upper outer wall, such that said upper elongated member has a substantially hat-shaped cross section bulging upward, formed with said top part, said upper inner wall, said upper outer wall, said upper inner flange, and said upper outer flange, and said second soft zone has an upper concave part that is concaved toward an inside of said rear frame at a location of said outer upper contour.

6. The vehicle rear body structure according to claim 2, wherein said lower elongated member comprises:

a bottom part that extends in the vehicle front-rear direction and has an inner edge and an outer edge with respect to the vehicle widthwise direction;

a lower inner wall that extends upward from the inner edge of said bottom part;

a lower outer wall that extends upward from the outer edge of said bottom part;

a lower inner flange that juts out inward in the vehicle widthwise direction from an upper edge of said lower inner wall, thereby forming an inner flange contour extending between said lower inner wall and said lower inner flange in the vehicle front-rear direction; and a lower outer flange that juts out outward in the vehicle widthwise direction from an upper edge of said lower outer wall, thereby forming an outer flange contour extending between said lower outer wall and said lower outer flange in the vehicle front-rear direction, such that said lower elongated member has a substantially hat-shaped cross section bulging downward, formed with said bottom part, said lower inner wall, said lower outer wall, said lower inner flange, and said lower outer flange, and said second soft zone has flange convex parts that protrude toward an outside of said rear frame arranged at respective locations of said inner flange contour and said outer flange contour.

7. The vehicle rear body rear structure according to claim 2, wherein said lower elongated member at a bottom part thereof has beads that extend in the vehicle front-rear direction at respective locations between said first soft zone and said second soft zone and between said second soft zone and said third soft zone.

8. The vehicle rear body structure according to claim 6, wherein said lower elongated member has a lower inner contour extending between said bottom part and said lower inner wall in the vehicle front-rear direction and a lower outer contour extending between said bottom part and said lower outer wall in the vehicle front-rear direction, and said first soft zone has bottom concave parts that are concaved toward an inside of said rear frame arranged at respective locations of said lower inner contour and said lower outer contour.

9. The vehicle rear body structure according to claim 1, wherein said bumper beam comprises:

a beam front wall that is provided on a front side of said bumper beam;

a beam rear wall that is provided on a rear side of said bumper beam;

a beam upper part that connects upper edges of said respective beam front wall and beam rear wall;

a beam lower part that connects lower edges of said respective beam front wall and beam rear wall; and a beam partition part that is disposed between said beam upper part and said beam lower part and is provided at a center between said beam front wall and said beam rear wall, said bumper beam having a cross section substantially in a shape of "8" formed with said beam front wall, said beam rear wall, said beam upper part, said beam lower part, and said beam partition part, such that the beam partition part divides said bumper beam into an upper beam part and a lower beam part, and said lower beam part has a thickness smaller than a thickness of said upper beam part.

\* \* \* \* \*